(12) United States Patent
Thomas et al.

(10) Patent No.: US 12,276,743 B2
(45) Date of Patent: Apr. 15, 2025

(54) CONFIGURATION AND REPORTING IN A NON-TERRESTRIAL NETWORK

(71) Applicant: Lenovo (United States) Inc., Morrisville, NC (US)

(72) Inventors: Robin Thomas, Frankfurt am Main (DE); Majid Ghanbarinejad, Chicago, IL (US); Sher Ali Cheema, Ilmenau (DE)

(73) Assignee: Lenovo (United States) Inc., Morrisville, NC (US)

( * ) Notice: Subject to any disclaimer, the term of this patent is extended or adjusted under 35 U.S.C. 154(b) by 518 days.

(21) Appl. No.: 17/554,583

(22) Filed: Dec. 17, 2021

(65) Prior Publication Data

US 2023/0194649 A1    Jun. 22, 2023

(51) Int. Cl.
*G01S 5/02*    (2010.01)
*G01S 5/10*    (2006.01)

(52) U.S. Cl.
CPC .............. *G01S 5/0246* (2020.05); *G01S 5/10* (2013.01)

(58) Field of Classification Search
CPC ...... G01S 5/0246; G01S 5/10; H04B 7/18547
See application file for complete search history.

(56) References Cited

U.S. PATENT DOCUMENTS

| | | | |
|---|---|---|---|
| 11,963,129 B2 | 4/2024 | Cheema et al. |
| 12,022,422 B2 | 6/2024 | Ghanbarinejad et al. |
| 2008/0177430 A1 | 7/2008 | Tekawy et al. |
| 2011/0117924 A1 | 5/2011 | Brunner et al. |
| 2013/0257648 A1 | 10/2013 | Garin et al. |
| 2014/0292564 A1 | 10/2014 | Park et al. |
| 2015/0018010 A1 | 1/2015 | Fischer |

(Continued)

FOREIGN PATENT DOCUMENTS

| | | |
|---|---|---|
| WO | 2013181264 A1 | 12/2013 |
| WO | 2021155578 A1 | 8/2021 |

OTHER PUBLICATIONS

"5G System (5GS) Location Services (LCS)", 3rd Generation Partnership Project; Technical Specification Group Services and System Aspects, 3GPP TS 23.273 V17.2.0, 3GPP Organizational Partners, Valbonne, France [retrieved Feb. 2, 2022]. Retrieved from the Internet <http://www.3gpp.org>., Sep. 2021, 99 pages.

(Continued)

*Primary Examiner* — Justin T Van Roie
(74) *Attorney, Agent, or Firm* — FIG. 1 Patents

(57) ABSTRACT

Various aspects of the present disclosure relate to a UE that receives, from a location server of a non-terrestrial network, first control signaling indicating a first PRS configuration that includes positioning assistance data and measurement reporting configuration. The UE also receives second control signaling indicating a second PRS configuration that indicates adapted PRS information based at least in part on mobility, an interference level, and/or a propagation delay pattern. The UE also receives third control signaling indicating a third PRS configuration that includes a duration for reporting a measurement of reference signals based at least in part on the adapted PRS information. The UE transmits, to the location server of the NTN, a report indicating the measurement of the reference signals and/or a location estimate based at least in part on the duration for the reporting.

20 Claims, 17 Drawing Sheets

(56) References Cited

U.S. PATENT DOCUMENTS

| | | |
|---|---|---|
| 2015/0382318 A1 | 12/2015 | Kim et al. |
| 2017/0168163 A1 | 6/2017 | Small |
| 2018/0048444 A1 | 2/2018 | Park et al. |
| 2021/0144539 A1 | 5/2021 | Edge et al. |
| 2021/0239783 A1 | 8/2021 | Calcev et al. |
| 2021/0306869 A1 | 9/2021 | Wei et al. |
| 2021/0328737 A1 | 10/2021 | Manolakos et al. |
| 2021/0360578 A1 | 11/2021 | Manolakos et al. |
| 2022/0095258 A1 | 3/2022 | Yeo et al. |
| 2022/0408497 A1 | 12/2022 | Matsuda et al. |
| 2023/0051054 A1* | 2/2023 | Ma ................ H04L 27/2613 |
| 2023/0199685 A1 | 6/2023 | Ghanbarinejad et al. |
| 2023/0199694 A1 | 6/2023 | Ghanbarinejad et al. |
| 2023/0199701 A1 | 6/2023 | Cheema et al. |

OTHER PUBLICATIONS

"Evolved Universal Terrestrial Radio Access (E-UTRA): Physical channels and modulation", 3rd Generation Partnership Project, Technical Specification Group Radio Access Network, 3GPP TS 36.211 V16.7.0, 3GPP Organizational Partners, Valbonne, France [retrieved Feb. 2, 2022]. Retrieved from the Internet <http://www.3gpp.org>., Sep. 2021, 249 pages.

"LTE Positioning Protocol (LPP)", 3rd Generation Partnership Project, Technical Specification Group Radio Access Network, 3GPP TS 37.355 V16.4.0, 3GPP Organizational Partners, Valbonne, France [retrieved Feb. 2, 2022]. Retrieved from the Internet <http://www.3gpp.org>., Mar. 2021, 298 pages.

"LTE Positioning Protocol (LPP)", 3rd Generation Partnership Project, Technical Specification Group Radio Access Network, 3GPP TS 37.355 V16.6.0, 3GPP Organizational Partners, Valbonne, France [retrieved Feb. 2, 2022]. Retrieved from the Internet <http://www.3gpp.org>., Sep. 2021, 299 pages.

"NG Radio Access Network (NG-RAN): Stage 2 functional specification of User Equipment (UE) positioning in NG-RAN", 3rd Generation Partnership Project, Technical Specification Group Radio Access Network, 3GPP TS 38.305 V16.6.0, 3GPP Organizational Partners, Valbonne, France [retrieved Feb. 2, 2022]. Retrieved from the Internet <http://www.3gpp.org>., Sep. 2021, 120 pages.

"NG-RAN: Architecture description", 3rd Generation Partnership Project, Technical Specification Group Radio Access Network, 3GPP TS 38.401 V16.7.0, 3GPP Organizational Partners, Valbonne, France [retrieved Feb. 2, 2022]. Retrieved from the Internet <http://www.3gpp.org>., Oct. 2021, 79 pages.

"NG-RAN: NR Positioning Protocol A (NRPPa)", 3rd Generation Partnership Project, Technical Specification Group Radio Access Network, 3GPP TS 38.455 V16.5.0, 3GPP Organizational Partners, Valbonne, France [retrieved Feb. 2, 2022]. Retrieved from the Internet <http://www.3gpp.org>., Oct. 2021, 152 pages.

"NR: Physical layer measurements", 3rd Generation Partnership Project, Technical Specification Group Radio Access Network, 3GPP TS 38.215 V16.3.0, 3GPP Organizational Partners, Valbonne, France [retrieved Feb. 2, 2022]. Retrieved from the Internet <http://www.3gpp.org>., Sep. 2020, 25 pages.

"Procedures for the 5G System (5GS)", 3rd Generation Partnership Project, Technical Specification Group Services and System Aspects, 3GPP TS 23.502 V17.2.1, 3GPP Organizational Partners, Valbonne, France [retrieved Feb. 2, 2022]. Retrieved from the Internet <http://www.3gpp.org>., Sep. 2021, 712 pages.

"System architecture for the 5G System (5GS)", 3rd Generation Partnership Project; Technical Specification Group Services and System Aspects, 3GPP TS 23.501 V17.2.0, 3GPP Organizational Partners, Valbonne, France [retrieved Feb. 2, 2022]. Retrieved from the Internet <http://www.3gpp.org>., Sep. 2021, 542 pages.

Cheema, Sher et al., "U.S. Application as Filed", U.S. Appl. No. 63/121,475, filed Dec. 4, 2020, 42 pages.

Cheema, Sher Ali et al., "U.S. Application as Filed", U.S. Appl. No. 17/554,689, filed Dec. 17, 2021, 68 pages.

Ghanbarinejad, Majid et al., "U.S. Application as Filed", U.S. Appl. No. 17/554,916, filed Dec. 17, 2021, 79 pages.

Ghanbarinejad, Majid et al., "U.S. Application as Filed", U.S. Appl. No. 17/555,164, filed Dec. 17, 2021, 87 pages.

Guidotti, A., et al., "Architectures, standardisation, and procedures for 5G Satellite Communications: A survey", Computer Networks, vol. 183 [retrieved Feb. 3, 2023]. Retrieved from the Internet <https://doi.org/10.1016/j.comnet.2020.107588>, Dec. 24, 2020, 18 pages.

Lenovo, Motorola Mobility, "Positioning Latency Reduction Enhancements", 3GPP TSG RAN WG2 Meeting#115-e, R2-2108127 [retrieved May 3, 2023]. Retrieved from the Internet <https://www.3gpp.org/ftp/tsg_ran/WG2_RL2/TSGR2_115-e/Docs>., Aug. 2021, 11 Pages.

PCT/IB2022/062251, "International Search Report and Written Opinion", PCT Application No. PCT/IB2022/062251, Mar. 3, 2023, 12 pages.

PCT/IB2022/062257, "International Search Report and Written Opinion", PCT Application No. PCT/IB2022/062257, Mar. 13, 2023, 16 pages.

PCT/IB2022/062333, "International Search Report and Written Opinion", PCT Application No. PCT/IB2022/062333, Mar. 16, 2023, 6 pages.

PCT/IB2022/062336, "International Search Report and Written Opinion", PCT Application No. PCT/IB2022/062336, May 9, 2023, 16 pages.

Zte, et al., "Discussion on positioning latency reduction", 3GPP TSG-RAN WG2 Meeting #116 electronic, R2-2109460, Online [retrieved May 3, 2023]. Retrieved from the Internet <https://www.3gpp.org/ftp/tsg_ran/WG2_RL2/TSGR2_116-e/Docs>., Nov. 2021, 6 Pages.

ZTE Corporation, et al., "Consideration on system information and cell (re)selection in NTN", 3GPP TSG-RAN WG2 Meeting#111, R2-2006872, Electronic [retrieved Mar. 16, 2023]. Retrieved from the Internet <https://www.3gpp.org/ftp/tsg_ran/WG2_RL2/TSGR2_111-e/Docs>, Aug. 2020, 6 pages.

U.S. Appl. No. 17/554,689, "Notice of Allowance", U.S. Appl. No. 17/554,689, filed Dec. 4, 2023, 7 pages.

U.S. Appl. No. 17/555,164, "Notice of Allowance", U.S. Appl. No. 17/555,164, filed Feb. 14, 2024, 8 pages.

U.S. Appl. No. 17/554,689, "Non-Final Office Action", U.S. Appl. No. 17/554,689, filed Aug. 30, 2023, 16 pages.

U.S. Appl. No. 17/554,689, "Corrected Notice of Allowability", U.S. Appl. No. 17/554,689, filed Mar. 13, 2024, 2 pages.

U.S. Appl. No. 17/555,164, "Corrected Notice of Allowability", U.S. Appl. No. 17/555,164, filed May 23, 2024, 2 pages.

U.S. Appl. No. 17/554,916, "Non-Final Office Action", U.S. Appl. No. 17/554,916, filed Jul. 5, 2024, 26 pages.

Ericsson, "Updates for R16 LTE Mobility Enhancements and LTE updates for R16 NR Mobility Enhancements", 3GPP TSG-RAN WG2 Meeting #110-e, R2-2005757, Electronic meeting, Jun. 2020, 1051 pages.

PCT/IB2022/062251, "International Preliminary Report on Patentability", International Application No. PCT/IB2022/062251, Jun. 27, 2024, 9 pages.

PCT/IB2022/062257, "International Preliminary Report on Patentability", International Application No. PCT/IB2022/062257, Jun. 27, 2024, 12 pages.

PCT/IB2022/062333, "International Search Report and Written Opinion", International Application No. PCT/IB2022/062333, Jun. 27, 2024, 11 pages.

PCT/IB2022/062336, "International Preliminary Report on Patentability", International Application No. PCT/IB2022/062336, Jun. 27, 2024, 11 pages.

"Final Office Action", U.S. Appl. No. 17/554,916, filed Feb. 6, 2025, 42 pages.

* cited by examiner

```
-- ASN1START

NR-DL-TDOA-ProvideAssistanceData-r16 ::= SEQUENCE {
    nr-DL-PRS-AssistanceData-r16       NR-DL-PRS-AssistanceData-r16       OPTIONAL,  -- Need ON
    nr-SelectedDL-PRS-IndexList-r16    NR-SelectedDL-PRS-IndexList-r16    OPTIONAL,  -- Need ON
    nr-PositionCalculationAssistance-r16
                                       NR-PositionCalculationAssistance-r16
                                                                          OPTIONAL,  -- Cond UER
    nr-DL-TDOA-Error-r16               NR-DL-TDOA-Error-r16               OPTIONAL,  -- Need ON
    ...
}

-- ASN1STOP
```

FIG. 2

```
-- ASN1START

NR-DL-TDOA-SignalMeasurementInformation-r16 ::= SEQUENCE {
    dl-PRS-ReferenceInfo-r16    DL-PRS-IdInfo-r16,
    nr-DL-TDOA-MeasList-r16     NR-DL-TDOA-MeasList-r16,
    ...
}

NR-DL-TDOA-MeasList-r16 ::= SEQUENCE (SIZE(1..nrMaxTRPs-r16)) OF NR-DL-TDOA-MeasElement-r16

NR-DL-TDOA-MeasElement-r16 ::= SEQUENCE {
    dl-PRS-ID-r16                  INTEGER (0..255),
    nr-PhysCellID-r16              NR-PhysCellID-r16              OPTIONAL,
    nr-CellGlobalID-r16            NCGI-r15                       OPTIONAL,
    nr-ARFCN-r16                   ARFCN-ValueNR-r15              OPTIONAL,
    nr-DL-PRS-ResourceId-r16       NR-DL-PRS-ResourceId-r16       OPTIONAL,
    nr-DL-PRS-ResourceSetId-r16    NR-DL-PRS-ResourceSetId-r16    OPTIONAL,
    nr-TimeStamp-r16               NR-TimeStamp-r16,
    nr-RSTD-r16                    CHOICE {
        k0-r16                         INTEGER (0..1970049),
        k1-r16                         INTEGER (0..985025),
        k2-r16                         INTEGER (0..492513),
        k3-r16                         INTEGER (0..246257),
        k4-r16                         INTEGER (0..123129),
        k5-r16                         INTEGER (0..61565),
        ...
    },
    nr-AdditionalPathList-r16      NR-AdditionalPathList-r16      OPTIONAL,
    nr-TimingQuality-r16           NR-TimingQuality-r16,
    nr-DL-PRS-RSRP-Result-r16      INTEGER (0..126)               OPTIONAL,
    nr-DL-TDOA-AdditionalMeasurements-r16
                                   NR-DL-TDOA-AdditionalMeasurements-r16
                                                                  OPTIONAL,
    ...
}

NR-DL-TDOA-AdditionalMeasurements-r16 ::= SEQUENCE (SIZE (1..3)) OF
                                   NR-DL-TDOA-AdditionalMeasurementElement-r16

NR-DL-TDOA-AdditionalMeasurementElement-r16 ::= SEQUENCE {
    nr-DL-PRS-ResourceId-r16       NR-DL-PRS-ResourceId-r16       OPTIONAL,
    nr-DL-PRS-ResourceSetId-r16    NR-DL-PRS-ResourceSetId-r16    OPTIONAL,
    nr-TimeStamp-r16               NR-TimeStamp-r16,
    nr-RSTD-ResultDiff-r16         CHOICE {
        k0-r16                         INTEGER (0..8191),
        k1-r16                         INTEGER (0..4095),
        k2-r16                         INTEGER (0..2047),
        k3-r16                         INTEGER (0..1023),
        k4-r16                         INTEGER (0..511),
        k5-r16                         INTEGER (0..255),
        ...
    },
    nr-TimingQuality-r16           NR-TimingQuality-r16,
    nr-DL-PRS-RSRP-ResultDiff-r16  INTEGER (0..61)                OPTIONAL,
    nr-AdditionalPathList-r16      NR-AdditionalPathList-r16      OPTIONAL,
    ...
}

-- ASN1STOP
```

```
NR-DL-PRS-ResourceSet-r16 ::= SEQUENCE {
    nr-DL-PRS-ResourceSetID-r16           NR-DL-PRS-ResourceSetID-r16,
    dl-PRS-Periodicity-and-ResourceSetSlotOffset-r16
                                          NR-DL-PRS-Periodicity-and-ResourceSetSlotOffset-r16,
    dl-PRS-ResourceRepetitionFactor-r16   ENUMERATED {n2, n4, n6, n8, n16, n32, ...}
                                                                                  OPTIONAL, -- Need OP
    dl-PRS-ResourceTimeGap-r16            ENUMERATED {s1, s2, s4, s8, s16, s32, ...}
                                                                                  OPTIONAL,
    -- Cond Rep
    dl-PRS-NumSymbols-r16                 ENUMERATED {n2, n4, n6, n12, ...},
    dl-PRS-MutingOption1-r16              DL-PRS-MutingOption1-r16
        OPTIONAL, -- Need OP
    dl-PRS-MutingOption2-r16              DL-PRS-MutingOption2-r16
        OPTIONAL, -- Need OP
    dl-PRS-ResourcePower-r16              INTEGER (-60..50),
    dl-PRS-ResourceList-r16               SEQUENCE (SIZE
        (1..nrMaxResourcesPerSet-r16)) OF
                                          NR-DL-PRS-Resource-r16,
        OPTIONAL, -- Need OP
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐
    dl-PRS-MutingOption1-r18              SEQUENCE (SIZE (1..MaxNoofMutingOption1))
    OF DL-PRS-MutingOption1AndTimer-r18       OPTIONAL, -- Need OP
    dl-PRS-MutingOption2-r18              SEQUENCE (SIZE (1..MaxNoofMutingOption2))
    OF DL-PRS-MutingOption2AndTimer-r18       OPTIONAL, -- Need OP
    ...
}

DL-PRS-MutingOption1AndTimer-r18 ::= SEQUENCE {
    dl-PRS-MutingOption1-r16              DL-PRS-MutingOption1-r16,
    expirationTimer                       ExpirationTimer
}

DL-PRS-MutingOption2AndTimer-r18 ::= SEQUENCE {
    dl-PRS-MutingOption2-r16              DL-PRS-MutingOption2-r16,
    expirationTimer                       ExpirationTimer
}
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘
                        1702
                                                                1700
```

FIG. 17

```
-- ASN1START
CommonIEsRequestLocationInformation ::= SEQUENCE {
    locationInformationType     LocationInformationType,
    triggeredReporting          TriggeredReportingCriteria  OPTIONAL,   -- Cond ECID
    periodicalReporting         PeriodicalReportingCriteria OPTIONAL,   -- Need ON
    additionalInformation       AdditionalInformation       OPTIONAL,   -- Need ON
    qos                         QoS                         OPTIONAL,   -- Need ON
    environment                 Environment                 OPTIONAL,   -- Need ON
    locationCoordinateTypes     LocationCoordinateTypes     OPTIONAL,   -- Need ON
    velocityTypes               VelocityTypes               OPTIONAL,   -- Need ON
    ...,
    [[
        messageSizeLimitNB-r14  MessageSizeLimitNB-r14      OPTIONAL    -- Need ON
    ]],
    [[
        segmentationInfo-r14    SegmentationInfo-r14        OPTIONAL    -- Need ON
    ]]
}

LocationInformationType ::= ENUMERATED {
    locationEstimateRequired,
    locationMeasurementsRequired,
    locationEstimatePreferred,
    locationMeasurementsPreferred,
    ...
}

PeriodicalReportingCriteria ::=     SEQUENCE {
    reportingAmount                     ENUMERATED {
                                            ra1, ra2, ra4, ra8, ra16, ra32,
                                            ra64, ra-Infinity
                                        } DEFAULT ra-Infinity,
    reportingInterval                   ENUMERATED {
                                            noPeriodicalReporting, ri0-25,
                                            ri0-5, ri1, ri2, ri4, ri8, ri16, ri32, ri64, ri128, ri264
                                        }
}                                                                                            2004

TriggeredReportingCriteria ::=      SEQUENCE {
    cellChange                          BOOLEAN,
    NTNCellChange                       BOOLEAN,
    NTNSatelliteInCoverage              ENUMERATED {...},
    reportingDuration                   ReportingDuration,
    ...
}                                   2002

ReportingDuration ::=               INTEGER (0..255)

AdditionalInformation ::= ENUMERATED {
    onlyReturnInformationRequested,
    mayReturnAdditionalInformation,
    ...
}

Environment ::= ENUMERATED {
    badArea,
    notBadArea,
    mixedArea,
    TNArea,
    NTNArea,
    ...
}                       2006
```

CONFIGURATION AND REPORTING IN A NON-TERRESTRIAL NETWORK

TECHNICAL FIELD

The present disclosure relates to wireless communications, and more specifically to configuration and reporting in a non-terrestrial network (NTN).

BACKGROUND

A wireless communications system may include one or multiple network communication devices, such as base stations, which may be otherwise known as an eNodeB (eNB), a next-generation NodeB (gNB), or other suitable terminology. Each network communication device, such as a base station, may support wireless communications for one or multiple user communication devices, which may be otherwise known as user equipment (UE), or other suitable terminology. The wireless communications system may support wireless communications with one or multiple user communication devices by utilizing resources of the wireless communication system, such as time resources (e.g., symbols, subslots, slots, subframes, frames, or the like) or frequency resources (e.g., subcarriers, carriers). Additionally, the wireless communications system may support wireless communications across various radio access technologies (RATs) including third generation (3G) RAT, fourth generation (4G) RAT, fifth generation (5G) RAT, and other suitable RATs beyond 5G.

In some cases, a wireless communications system may be an NTN, which may support various communication devices to support wireless communications in the NTN. For example, an NTN may include network entities onboard non-terrestrial vehicles such as satellites, unmanned aerial vehicles (UAV), and high-altitude platforms systems (HAPS), as well as network entities on the ground, such as gateway entities capable of transmitting and receiving over long distances. In a positioning system for an NTN, one or more location servers, or components of the location servers, may communicate with one or multiple user equipment (UEs) connected to the NTN over a wireless medium. In some cases, in an NTN, propagation delays can be orders of magnitude longer than those in a typical terrestrial network (TN). Additionally, satellites or any other non-terrestrial transmit-receive points (NT-TRPs), may be moving at high speeds, for example in the case of low-earth orbit (LEO) and medium-earth orbit (MEO) satellite systems. Other non-terrestrial systems, such as geosynchronous satellite systems, may also introduce wireless communication challenges due to NT-TRP movements.

SUMMARY

The present disclosure relates to methods, apparatuses, and systems that enable a communication device (e.g., a UE, a base station, a network entity) to perform measurement of reference signals (such as, positioning reference signals (PRS)) and reporting of positioning information of the communication device in an NTN. For example, the communication device may be configured with a PRS configuration, and the communication device may perform PRS measurement and reporting of positioning information according to RAT-dependent positioning operations in an NTN. In some implementations, the communication device may receive the PRS configuration from a location server configured with a location management function (LMF). The PRS configuration may include one or more parameters for supporting accurate measurement and reporting of positioning information of the communication device in a low-latency manner, accounting for moving TRPs, higher Doppler shift, and long propagation delays in the NTN.

By supporting measurement and reporting according to RAT-dependent positioning operations in an NTN, a communication device may verify its location and perform optimized low-latency radio positioning. For example, a communication device, such as UE in wireless communication with a satellite in an NTN may report location using onboard devices, which needs to be verified by the network using RAT-dependent positioning methods. Additionally, by supporting measurement and reporting according to RAT-dependent positioning operations in an NTN, a communication device may experience improved NTN positioning in rural and remote areas, where cellular TRPs are otherwise rare, intermittent, or non-existent. Additionally, satellites in LEO and MEO systems travel on predictable trajectories and at high speeds, causing a significant Doppler effect in signals received on the ground, which may also be taken into account for positioning enhancements.

In aspects of the disclosure, the location configuration and measurement reporting takes into account the longer duration propagation delays that can be experienced between network entities communicating in an NTN. This disclosure provides separate positioning system information blocks for broadcasting assistance data and/or measurement configurations to UE performing network-based positioning, and an extended response time over an adapted reporting interval for a UE to provide a location measurement report to the location server that implements the LMF, including specific triggering reporting criteria. Additionally, the PRS configuration design is adapted, taking into account doppler shifts, timing drifts, mobility patterns, and changes in muting pattern configurations that can be encountered when performing positioning procedures in an NTN.

Some implementations of the method and apparatuses described herein may further include wireless communication at a device (e.g., UE), which includes a receiver to receive, from a location server of an NTN, first control signaling indicating a first PRS configuration that includes positioning assistance data and measurement reporting configuration. In an aspect of the disclosure, the positioning assistance data and the measurement reporting configuration is combined in an NTN configuration message received from the location server. The device also receives second control signaling indicating a second PRS configuration that indicates adapted PRS information based on mobility, an interference level, and/or a propagation delay pattern. The device also receives third control signaling indicating a third PRS configuration that includes a duration for reporting a measurement of reference signals based at least in part on the adapted PRS information. The device includes a transmitter to transmit, to the location server of the NTN, a report indicating at least one of the measurement of the reference signals or a location estimate based at least in part on the duration for the reporting.

Some implementations of the method and apparatuses described herein may further include network signaling at a device (e.g., a location server), which includes a transmitter to transmit, to a UE in an NTN, first control signaling indicating a first PRS configuration that includes positioning assistance data and measurement reporting configuration. In an aspect of the disclosure, the positioning assistance data and the measurement reporting configuration is combined in an NTN configuration message transmitted from the location server to the UE. The device also transmits second control signaling indicating a second PRS configuration that indicates updated PRS information based at least in part on mobility, an interference level, and/or a propagation delay pattern. The device also transmits third control signaling indicating a third PRS configuration that includes a duration for reporting a measurement of reference signals based at least in part on the updated PRS information. The device includes a receiver to receive, from a UE in the NTN, a positioning measurement report and/or a location estimate from the UE, the positioning measurement report indicating positioning measurements associated with PRS transmissions.

BRIEF DESCRIPTION OF THE DRAWINGS

Various aspects of the present disclosure for configuration and reporting in an NTN are described with reference to the following Figures. The same numbers may be used throughout to reference like features and components shown in the Figures.

FIG. 2 illustrates an example of assistance data configuration with respect to UE measurement and report configuration signaling, adaptable for configuration and reporting in an NTN in accordance with aspects of the present disclosure.

FIG. 3 illustrates an example of a positioning measurement report with respect to UE measurement and report configuration signaling, adaptable for reporting in an NTN in accordance with aspects of the present disclosure.

FIG. 16 illustrates an example of new radio downlink positioning reference signal (NR-DL-PRS)-information as related to configuration and reporting in an NTN in accordance with aspects of the present disclosure.

FIG. 17 illustrates an example of downlink configuration positioning information parameters as related to configuration and reporting in an NTN in accordance with aspects of the present disclosure.

FIG. 20 illustrates an example configuration for triggered reporting criteria and reporting intervals that take into account UE reporting measurements and/or location estimates as related to configuration and reporting in an NTN in accordance with aspects of the present disclosure.

DETAILED DESCRIPTION

Figure 1:
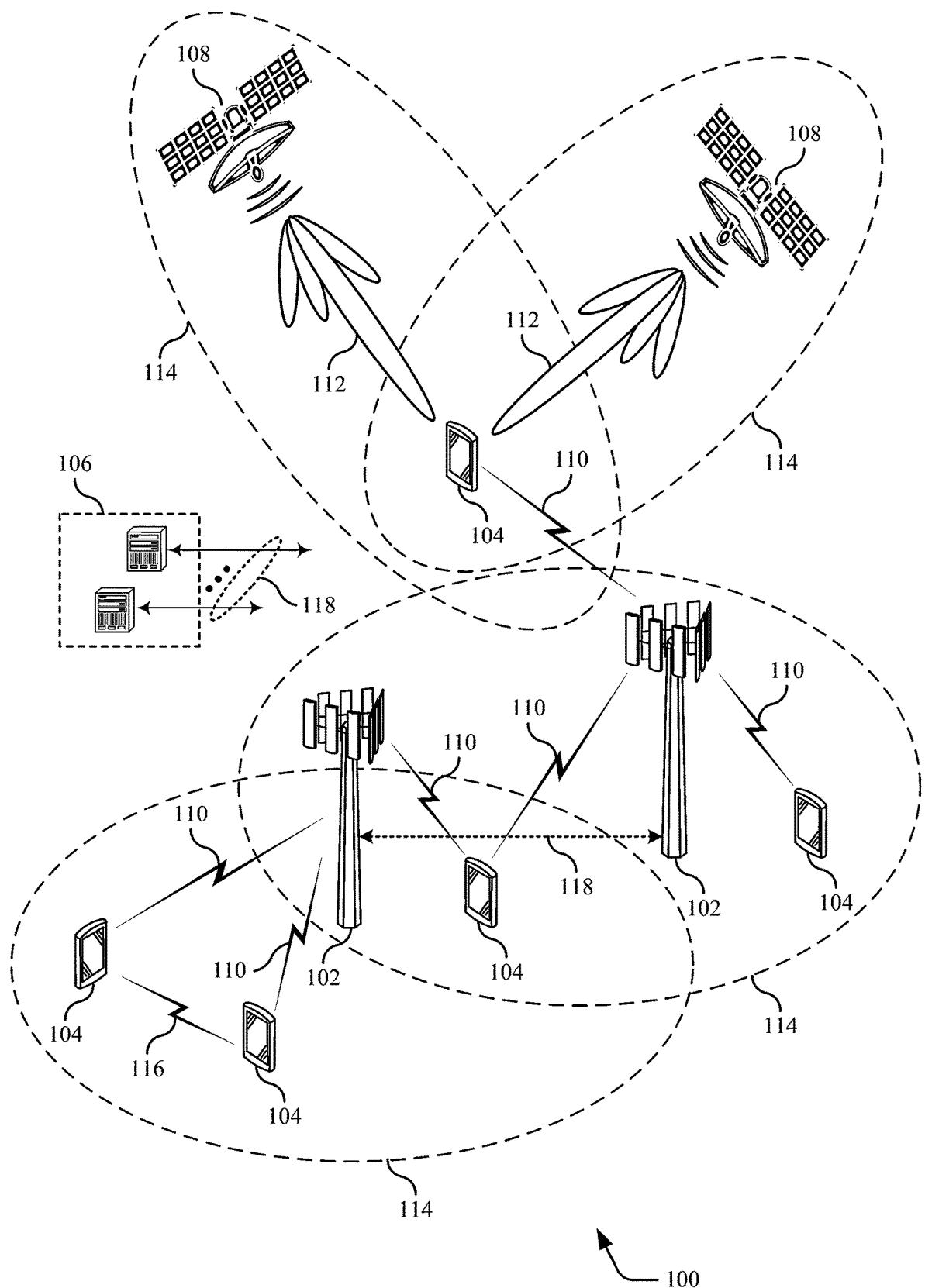
FIG. 1 illustrates an example of a wireless communications system that supports configuration and reporting in an NTN in accordance with aspects of the present disclosure.

Implementations of configuration and reporting in an NTN are described, such as related to PRS configuration, measurement, processing, and reporting utilizing RAT-dependent positioning for UE connected to an NTN. The configuration signaling parameters from a location server that implements a LMF are adapted to facilitate a target UE being able to report accurate positioning measurements in a low-latency manner, taking into consideration the moving TRPs, higher Doppler shift, and long propagation delays. The present disclosure provides configuration, reporting, and signaling enhancements to support the RAT-dependent positioning procedures over an NTN using 3GPP NR technology and radio access node (RAN) functionality that supports signaling procedures to enable the RAT NR positioning.

An NTN system can include satellites and gateway entities transmitting and receiving over long distances with location servers and UE connected to the NTN for wireless communications. Notably, the moving TRPs, higher Doppler shift, and long propagation delays add levels of complexity to enable wireless communications utilizing NG-RAN technology in an NTN. Procedures for PRS configuration, measurement, processing, and reporting are lacking for NTN entities, such as for satellites and gateway network entities in the third generation partnership project (3GPP) positioning architecture. Further, regulatory and emergency services requirements need to be addressed, so that configured PRS resources and reported positioning measurements are conveyed to a target UE in a timely manner, particularly given the round-trip time (RTT) delays experienced in an NTN. For effective network-based positioning in an NTN, a location server that implements a LMF needs to receive the measurement report and location estimates from a UE in a low-latency manner, which introduces a challenge given the extended propagation times over which the positioning reports and estimates are communicated in an NTN.

The positioning processes in an NTN take into account several different considerations than those for typical TN positioning, such as the longer propagation delays, moving satellites in the case of LEO and/or MEO satellite systems, larger pathloss, uncertainty about the number of satellites in range at any particular moment, and so on. The positioning processes in an NTN also utilize different and/or additional positioning data than for TN positioning, such as ephemeris data related to satellite movements and satellite architecture information, such as an architecture based on a regenerative payload architecture (RPA) model or a transparent payload architecture (TPA) model. For typical TN positioning, the LMF does not need the NT-related configuration information for a positioning process for a UE, given that TRPs are capable of positioning at network nodes with gNBs (base stations) that are typically static (e.g., non-moving), and their signal strength, communication capabilities, behaviors, etc. are more predictable. Whereas, in an NTN, the LMF may not have sufficient node information to configure signaling, particularly when a signaling failure may occur as the number of satellites in communication range changes dynamically.

In aspects of the disclosure for configuration and reporting in an NTN, location configuration, processing, and measurement reporting takes into account the longer duration propagation delays that can be experienced between network entities communicating in the NTN. This disclosure provides separate positioning system information blocks for broadcasting assistance data and/or measurement configurations to UE performing network-based positioning, and an extended response time over an adapted reporting interval for a UE to provide a location measurement report to the location server that implements the LMF, including specific triggering reporting criteria. Additionally, the PRS configuration design is adapted, taking into account doppler shifts, timing drifts, and changes in muting pattern configurations that can be encountered when performing positioning procedures in an NTN.

Aspects of the disclosure include configuration, adaptation, and/or enhancements of NG-RAN signaling in an NTN. The enhanced signaling can take into account any type of NTN entity and the associated configuration data for the entity. As described herein, an NTN entity may also be referred to as any type of non-terrestrial station (NTS), which may be any type of TRPs, which may be onboard geostationary and/or geosynchronous (GEO) satellites, MEO satellites, LEO satellites, high-altitude platform systems (HAPS), unmanned aerial vehicles (UAV), aircraft, or any other vehicle travelling in the earth's atmosphere, orbiting in outer space, and similar type entities. Any entity referred to as a NTS in the present disclosure may be referring to a satellite, satellite access node, network node, NG-RAN node, non-terrestrial transmission-reception point (NT-TRP), NTN transmission point (TP), NTN reception point (RP), and the like.

Aspects of the present disclosure are described in the context of a wireless communications system. Aspects of the present disclosure are further illustrated and described with reference to device diagrams and flowcharts that relate to configuration and reporting in an NTN.

FIG. 1 illustrates an example of a wireless communications system 100 that supports configuration and reporting in an NTN in accordance with aspects of the present disclosure. The wireless communications system 100 may include one or more base stations 102, one or more UEs 104, a core network 106, and one or more non-terrestrial stations (NTSs) 108, such as satellite access nodes. The wireless communications system 100 may support various radio access technologies. In some implementations, the wireless communications system 100 may be a 4G network, such as a LTE network or an LTE-A network. In some other implementations, the wireless communications system 100 may be a 5G network, such as a NR network. In other implementations, the wireless communications system 100 may be a combination of a 4G network and a 5G network. The wireless communications system 100 may support radio access technologies beyond 5G. Additionally, the wireless communications system 100 may support technologies, such as time division multiple access (TDMA), frequency division multiple access (FDMA), or code division multiple access (CDMA), etc.

The one or more base stations 102 may be dispersed throughout a geographic region to form the wireless communications system 100. One or more of the base stations 102 described herein may be or include or may be referred to as a base transceiver station, an access point, a NodeB, an eNB, a gNB, or other suitable terminology. A base station 102 and a UE 104 may communicate via a communication link 110, which may be a wireless or wired connection. For example, a base station 102 and a UE 104 may perform wireless communication over a NR-Uu interface. The one or more NTSs 108 described herein may be or include any type of TRPs (which may be onboard geostationary and/or geosynchronous satellites), MEO satellites, LEO satellites, HAPS, UAV, aircraft, or any other vehicle travelling in the earth's atmosphere, orbiting in outer space, and the like. Any entity referred to as a non-terrestrial station (NTS) in the present disclosure may be referring to a satellite, a satellite access node, NTN node, NG-RAN node, NT-TRP, NTN TPs, NTN RP, and similar type entities. A NTS 108 and a UE 104 may communicate via a communication link 112, which may be a wireless connection via a transmission beam and/or a reception beam.

A base station 102 and/or a NTS 108 may provide a geographic coverage area 114 for which the base station 102 and/or NTS 108 may support services (e.g., voice, video, packet data, messaging, broadcast, etc.) for one or more UE 104 within the geographic coverage area. For example, a base station 102 and a UE 104 may support wireless communication of signals related to services (e.g., voice, video, packet data, messaging, broadcast, etc.) according to one or multiple radio access technologies. Similarly, a NTS 108 and a UE 104 may support wireless communication of signals related to services (e.g., voice, video, packet data, messaging, broadcast, etc.) according to one or multiple radio access technologies. In some implementations, a base station 102 may be moveable, such as when implemented as a gNB onboard a satellite associated with an NTN. In some implementations, different geographic coverage areas 114 associated with the same or different radio access technologies may overlap, and different geographic coverage areas 114 may be associated with different base stations 102 and/or with different NTSs 108. Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The one or more UEs 104 may be dispersed throughout a geographic region or coverage area 114 of the wireless communications system 100. A UE 104 may include or may be referred to as a mobile device, a wireless device, a remote device, a handheld device, or a subscriber device, or some other suitable terminology. In some implementations, the UE 104 may be referred to as a unit, a station, a terminal, or a client, among other examples. Additionally, or alternatively, a UE 104 may be referred to as an Internet-of-Things (IoT) device, an Internet-of-Everything (IoE) device, or machine-type communication (MTC) device, among other examples. In some implementations, a UE 104 may be stationary in the wireless communications system 100, such as a very small aperture terminal (VSAT), which may be connected to one or multiple other network nodes serving other UEs. In some other implementations, a UE 104 may be mobile in the wireless communications system 100, such as an earth station in motion (ESIM).

The one or more UEs 104 may be devices in different forms or having different capabilities. A UE 104 may be capable of communicating with various types of devices, such as the base stations 102, other UEs 104, NTSs 108, or network equipment (e.g., the core network 106, a relay device, a gateway device, an integrated access and backhaul (IAB) node, a location server that implements the LMF, or other network equipment). Additionally, or alternatively, a UE 104 may support communication with other base stations 102 or UE 104, which may act as relays in the wireless communications system 100.

A UE 104 may also support wireless communication directly with other UE 104 over a communication link 116. For example, a UE 104 may support wireless communication directly with another UE 104 over a device-to-device (D2D) communication link. In some implementations, such as vehicle-to-vehicle (V2V) deployments, vehicle-to-everything (V2X) deployments, or cellular-V2X deployments, the communication link 116 may be referred to as a sidelink. For example, a UE 104 may support wireless communication directly with another UE 104 over a PC5 interface.

A base station 102 may support communications with the core network 106, or with another base station 102, or both. For example, a base station 102 may interface with the core network 106 through one or more backhaul links 118 (e.g., via an S1, N2, or other network interface). The base stations 102 may communicate with each other over the backhaul links 118 (e.g., via an X2, Xn, or another network interface). In some implementations, the base stations 102 may communicate with each other directly (e.g., between the base stations 102). In some other implementations, the base stations 102 and/or NTSs 108 may communicate with each other indirectly (e.g., via the core network 106). In some implementations, one or more base stations 102 may include subcomponents, such as an access network entity, which may be an example of an access node controller (ANC). The ANC may communicate with the one or more UEs 104 through one or more other access network transmission entities, which may be referred to as a radio heads, smart radio heads, gateways, TRPs, and other network nodes and/or entities.

The core network 106 may support user authentication, access authorization, tracking, connectivity, and other access, routing, or mobility functions. The core network 106 may be an evolved packet core (EPC), or a 5G core (5GC), which may include a control plane entity that manages access and mobility (e.g., a mobility management entity (MME), an access and mobility management functions (AMF)), and a user plane entity that routes packets or interconnects to external networks (e.g., a serving gateway (S-GW), a Packet Data Network (PDN) gateway (P-GW), or a user plane function (UPF)). In some implementations, the control plane entity may manage non-access stratum (NAS) functions, such as mobility, authentication, and bearer management for the one or more UEs 104 served by the one or more base stations 102 associated with the core network 106.

In at least one implementation, one or more of the UEs 104, the base stations 102, and/or one or more of the NTSs 108 are operable to implement various aspects of configuration and reporting in an NTN, as described herein. For instance, leveraging the described techniques, a UE 104 is operable to communicate with a NTS 108 to facilitate wireless communications. The positioning processes in an NTN take into account several different considerations than those for typical TN positioning, such as the longer propagation delays, moving satellites in the case of LEO and/or MEO satellite systems, larger pathloss, uncertainty about the number of satellites in range at any particular moment, and so on. The positioning processes in an NTN also utilizes different and/or additional positioning data than for TN positioning. In aspects of the disclosure, configuration, processing, and measurement reporting takes into account the longer duration propagation delays that can be experienced between network entities communicating in the NTN.

With reference to terrestrial networks (TNs), 3GPP (release 17) defines the positioning performance requirements. For example, the positioning error requirement for end-to-end latency for a position estimate of a UE in a commercial use case is less than 100 ms, and in an IIoT use case is less than 100 ms, within the order of 10 ms being desired. However, these positioning performance requirements do not take into account the latency experienced in NTN systems, and do not address obtaining a position estimate for a UE given the extended propagation delays, such as for signaling and communications between a UE and a NTS (e.g., a satellite).

In aspects of configuration and reporting in an NTN, various RAT-dependent positioning techniques (also referred to as positioning methods, or positioning procedures) are supported for a UE, for UE assisted, LMF-based, and/or for NG-RAN node assisted. Additionally, various RAT-independent positioning techniques, such as network-assisted global navigation satellite system (GNSS) methods, may also be utilized separately or in combination with the described RAT-dependent positioning techniques to determine the location of a UE. The RAT-dependent positioning techniques that are supported include downlink-time difference of arrival (DL-TDOA), downlink-angle of departure (DL-AoD), multi-round trip time (multi-RTT), new radio enhanced cell-ID (NR E-CID); uplink-time difference of arrival (UL-TDOA); and uplink-angle of arrival (UL-AoA).

The DL-TDOA positioning technique utilizes at least three network nodes for positioning based on triangulation. The DL-TDOA positioning method makes use of the downlink reference signal time difference (RSTD) (and optionally DL PRS RSRP) of downlink signals received from multiple transmission points (TPs) at the UE. The UE measures the downlink RSTD (and optionally DL PRS RSRP) of the received signals using assistance data received from the positioning server (also referred to herein as the location server), and the resulting measurements are used along with other configuration information to locate the UE in relation to the neighboring TPs. In terms of 2D localization, three or more network nodes are required, while in the case of 3D location estimation, four or more network nodes are desirable, where nodes are TPs.

The DL-AoD positioning technique makes use of the measured downlink PRS reference signal received power (RSRP) (DL PRS RSRP) of downlink signals received from multiple TPs at the UE. The UE measures the DL PRS RSRP of the received signals using assistance data received from the positioning server (also referred to herein as the location server), and the resulting measurements are used along with other configuration information to locate the UE in relation to the neighboring TPs. The location estimate accuracy of the DL-AoD technique will also improve for N≥1 nodes.

The multi-RTT positioning technique makes use of the UE Rx-Tx measurements and downlink PRS reference signal received power (RSRP) (DL PRS RSRP) of downlink signals received from multiple TRPs, as measured by the UE and the measured gNB Rx-Tx measurements and uplink sounding reference signal (SRS) reference signal received power (RSRP) (UL SRS-RSRP) at multiple TRPs of uplink signals transmitted from UE. The UE measures the UE Rx-Tx measurements (and optionally DL PRS RSRP of the received signals) using assistance data received from the positioning server (also referred to herein as the location server), and the TRPs the gNB Rx-Tx measurements (and optionally UL SRS-RSRP of the received signals) using assistance data received from the positioning server. The measurements are used to determine the round-trip time (RTT) at the positioning server, which are used to estimate the location of the UE. The location estimate accuracy of the multi-RTT positioning technique will also improve for N≥1 nodes.

For the NR E-CID positioning technique, the position of a UE is estimated with the knowledge of its serving next generation evolved NodeB (ng-eNB), gNB and cell, and is based on LTE signals. The information about the serving next generation evolved NodeB (ng-eNB), gNB and cell may be obtained by paging, registration, or other methods. The NR enhanced cell-ID (NR E-CID) positioning refers to techniques which use additional UE measurements and/or NR radio resources and other measurements to improve the UE location estimate using NR signals. Although enhanced cell-ID (E-CID) positioning may utilize some of the same measurements as the measurement control system in the radio resource control (RRC) protocol, the UE is not expected to make additional measurements for the sole purpose of positioning (i.e., the positioning procedures do not supply a measurement configuration or measurement control message, and the UE reports the measurements that it has available rather than being required to take additional measurement actions).

The UL-TDOA positioning technique makes use of the uplink time difference of arrival (UL-TDOA) (and optionally UL SRS-RSRP) at multiple reception points (RPs) of uplink signals transmitted from UE. The RPs measure the UL-TDOA (and optionally UL SRS-RSRP) of the received signals using assistance data received from the positioning server, and the resulting measurements are used along with other configuration information to estimate the location of the UE. The location estimate accuracy of the UL-TDOA technique will also improve for N≥3 nodes.

The UL-AoA positioning technique makes use of the measured azimuth and the zenith of arrival at multiple RPs of uplink signals transmitted from UE. The RPs measure azimuth-AoA and zenith-AoA of the received signals using assistance data received from the positioning server (also referred to herein as the location server), and the resulting measurements are used along with other configuration information to estimate the location of the UE. The location estimate accuracy of the UL-AoA technique will also improve for N≥1 nodes.

With regard to positioning measurements and reference signals, a PRS that is transmitted on the downlink from a NTS can be locally associated with a PRS resource ID and resource set ID for a base station (e.g., TRP). Similarly, UE positioning measurements, such as RSTD and PRS reference signal received power (RSRP) (PRS RSRP) measurements are made between beams (e.g., between a different pair of downlink positioning reference signal (DL PRS) resources or DL PRS resource sets) as opposed to different cells, as was the case in LTE. There are additional uplink positioning methods that a network can utilize to compute the location of a target UE. Tables T1 and T2 show the reference signal to measurements mapping for each of the supported RAT-dependent positioning techniques at the UE and gNB, respectively.

TABLE T1

UE measurements to enable RAT-dependent positioning techniques.

| DL/UL Reference Signals | UE Measurements | To facilitate support of the positioning techniques |
|---|---|---|
| Rel. 16 DL PRS | DL RSTD | DL-TDOA |
| Rel. 16 DL PRS | DL PRS RSRP | DL-TDOA, DL-AoD, Multi-RTT |
| Rel. 16 DL PRS/ Rel. 16 SRS for positioning | UE Rx-Tx time difference | Multi-RTT |
| Rel. 15 SSB/CSI-RS for RRM | SS-RSRP(RSRP for RRM), SS-RSRQ(for RRM), CSI-RSRP (for RRM), CSI-RSRQ (for RRM), SS-RSRPB (for RRM) | NR E-CID |

TABLE T2 gNB measurements to enable RAT-dependent positioning techniques.

| DL/UL Reference Signals | gNB Measurements | To facilitate support of the positioning techniques |
|---|---|---|
| Rel. 16 SRS for positioning | UL RTOA | UL-TDOA |
| Rel. 16 SRS for positioning | UL SRS-REFERENCE SIGNAL RECEIVED POWER (RSRP) | UL-TDOA, UL-AoA, Multi-RTT |
| Rel.16 SRS for positioning, Rel. 16 DL PRS | gNB Rx-Tx time difference | Multi-RTT |

TABLE T2-continued gNB measurements to enable RAT-dependent positioning techniques.

| DL/UL Reference Signals | gNB Measurements | To facilitate support of the positioning techniques |
|---|---|---|
| Rel. 16 SRS for positioning | AoA and ZoA | UL-AoA, Multi-RTT |

The RAT-dependent positioning techniques can utilize the 3GPP RAT and core network entities to perform the position estimation of the UE, which are differentiated from RAT-independent positioning techniques, which rely on GNSS, IMU sensor, WLAN, and Bluetooth technologies for performing target device (UE) positioning. These aspects of NR downlink-based positioning are applicable, and can be extended and adapted for an NTN gNB. For example, the location server that implements the LMF is typically a component of the core network, but in aspects of the described disclosure, may be implemented with the gNB onboard a NTS, such as a satellite. In this implementation, positioning of the UE may be determined faster than if the LMF is ground-based at the core network.

FIG. 2 illustrates an example 200 of assistance data configuration (current implementation Rel-16), with respect to UE measurement and report configuration signaling applicable to downlink-based positioning techniques. In the DL-TDOA assistance data, the information element (IE) NR-DL-TDOA-ProvideAssistanceData 202 is used by the location server to provide assistance data to enable UE-assisted and UE-based NR DL-TDOA, and may also be used to provide a NR DL-TDOA positioning specific error reason.

FIG. 3 illustrates an example 300 of a positioning measurement report (current implementation Rel-16), with respect to UE measurement and report configuration signaling applicable to downlink-based positioning techniques. In the DL-TDOA measurement report, the information element (IE) NR-DL-TDOA-SignalMeasurementInformation 302 is used by the target UE to provide NR DL-TDOA measurements to the location server. The measurements are provided as a list of TRPs, where the first TRP in the list is used as reference TRP in case RSTD measurements are reported. The first TRP in the list may or may not be the reference TRP indicated in the NR-DL-PRS-AssistanceData. Furthermore, the target UE selects a reference resource per the TRP, and compiles the measurements per the TRP based on the selected reference resource.

The different downlink measurements, including downlink PRS reference signal received power (RSRP), downlink RSTD, and UE Rx-Tx time difference required for the supported RAT-dependent positioning techniques are shown in Table T3. The measurement configurations may include four (4) pair of downlink RSTD measurements performed per pair of cells, and each measurement is performed between a different pair of downlink PRS resources or resource sets with a single reference timing; and eight (8) downlink PRS reference signal received power (RSRP) measurements can be performed on different downlink PRS resources from the same cell.

TABLE T3

Downlink measurements for downlink-based positioning techniques.

DL PRS RSRP

| | |
|---|---|
| Definition | DL PRS-RSRP, is the linear average over the power contributions (in [W]) of the resource elements that carry DL PRS reference signals configured for RSRP measurements within the considered measurement frequency bandwidth. For frequency range 1, the reference point for the DL PRS-RSRP shall be the antenna connector of the UE. For frequency range 2, DL PRS-RSRP shall be measured based on the combined signal from antenna elements corresponding to a given receiver branch. For frequency range 1 and 2, if receiver diversity is in use by the UE, the reported DL PRS-RSRP value shall not be lower than the corresponding DL PRS-RSRP of any of the individual receiver branches. |
| Applicable for | RRC_CONNECTED intra-frequency, RRC_CONNECTED inter-frequency |

DL reference signal time difference (DL RSTD)

| | |
|---|---|
| Definition | DL reference signal time difference (DL RSTD) is the DL relative timing difference between the positioning node j and the reference positioning node i, defined as $T_{SubframeRxj} - T_{SubframeRxi}$, Where: $T_{SubframeRxj}$ is the time when the UE receives the start of one subframe from positioning node j. $T_{SubframeRxi}$ is the time when the UE receives the corresponding start of one subframe from positioning node i that is closest in time to the subframe received from positioning node j. Multiple DL PRS resources can be used to determine the start of one subframe from a positioning node. For frequency range 1, the reference point for the DL RSTD shall be the antenna connector of the UE. For frequency range 2, the reference point for the DL RSTD shall be the antenna of the UE. |
| Applicable for | RRC_CONNECTED intra-frequency RRC_CONNECTED inter-frequency |

UE Rx-Tx time difference

| | |
|---|---|
| Definition | The UE Rx − Tx time difference is defined as $T_{UE-RX} - T_{UE-TX}$ Where: $T_{UE-RX}$ is the UE received timing of downlink subframe #i from a positioning node, defined by the first detected path in time. |

TABLE T3-continued

Downlink measurements for downlink-based positioning techniques.

$T_{UE-TX}$ is the UE transmit timing of uplink subframe #j that is closest in time to the subframe #i received from the positioning node.
Multiple DL PRS resources can be used to determine the start of one subframe of the first arrival path of the positioning node.
For frequency range 1, the reference point for $T_{UE-RX}$ measurement shall be the Rx antenna connector of the UE and the reference point for $T_{UE-TX}$ measurement shall be the Tx antenna connector of the UE. For frequency range 2, the reference point for $T_{UE-RX}$ measurement shall be the Rx antenna of the UE and the reference point for $T_{UE-TX}$ measurement shall be the Tx antenna of the UE.

| Applicable for | RRC_CONNECTED intra-frequency |
| | RRC_CONNECTED inter-frequency |

Figure 4:
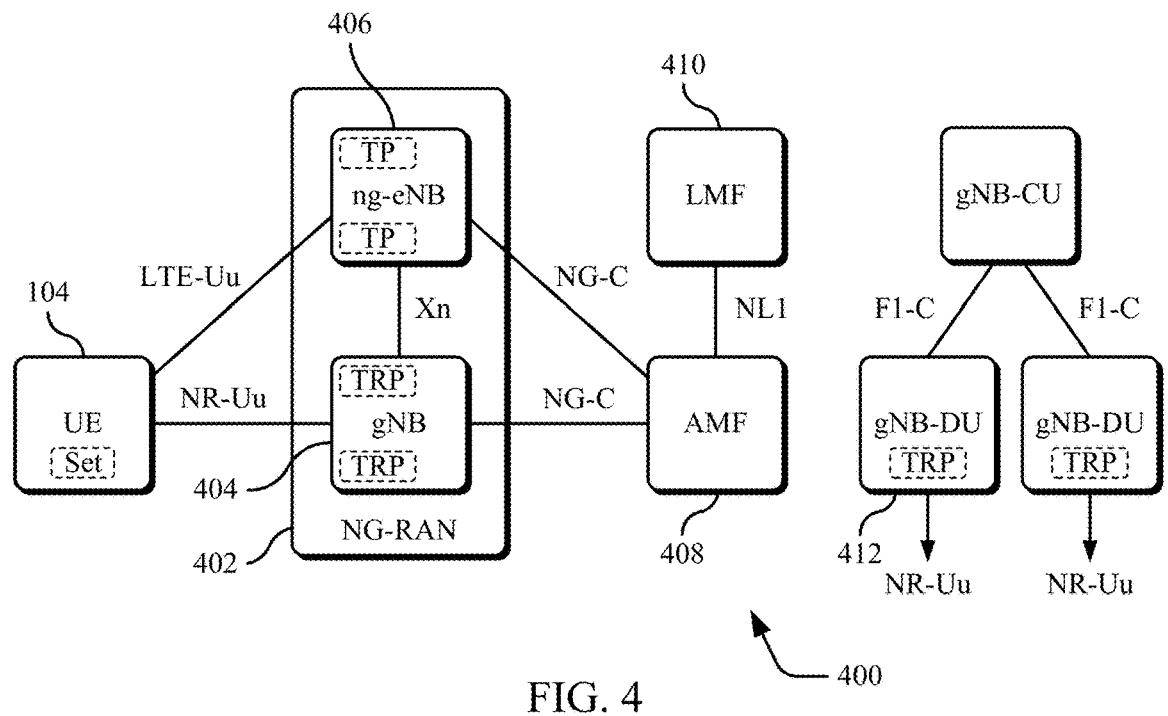
FIG. 4 illustrates an example network architecture applicable to next generation radio access network (NG-RAN) for UE positioning as related to configuration and reporting in an NTN in accordance with aspects of the present disclosure.

FIG. 4 illustrates an example architecture 400 applicable to NG-RAN 402 for UE positioning. The NG-RAN 402 is capable of supporting both types of interfaces LTE-Uu and NR-Uu, and the gNB 404 may be implemented in an NTN architecture. The gNB 404 and an LTE next generation evolved NodeB (ng-eNB) 406 are connected by a Xn backhaul interface. The access and mobility management function (AMF) 408 may be transparent, or bypassed in an NTN architecture, and the LMF 410 provides the positioning techniques and configuration for UE positioning.

The AMF 408 may receive a request for some location service associated with a particular target UE 104 from another entity (e.g., a gateway mobile location center (GMLC) or UE), or the AMF itself decides to initiate some location service on behalf of a particular target UE, such as for an IP multimedia subsystem (IMS) emergency call from the UE. The AMF 408 then sends a location services request to the LMF 410. The LMF 410 processes the location services request which may include transferring assistance data to the target UE 104 to assist with UE-based and/or UE-assisted positioning and/or may include positioning of the target UE. The LMF 410 then returns the result of the location service back to the AMF 408 (e.g., a position estimate for the UE 104). In the case of a location service requested by an entity other than the AMF (e.g., requested by a GMLC or UE), the AMF 408 returns the location service result to this entity.

An NG-RAN node may control several TRPs and/or TPs, such as remote radio heads, or downlink PRS-only TPs for support of PRS-based terrestrial beacon system (TBS). A LMF 410 may have a proprietary signaling connection to an enhanced serving mobile location center (E-SMLC), which may enable the LMF 410 to access information from an evolved universal terrestrial radio access network (E-UTRAN) (e.g. to support the observed time difference of arrival (OTDOA) for a E-UTRA positioning method using downlink measurements obtained by a target UE of signals from next generation evolved NodeBs (ng-eNBs) and/or PRS-only TPs in E-UTRAN). A LMF 410 may have a proprietary signaling connection to a SUPL location platform (SLP). The SUPL location platform (SLP) is the secure user plane location (SUPL) entity responsible for positioning over the user plane. In the case of a split gNB architecture, a gNB-distributed unit (DU) 412 may include TRP functionality, where the TRP functionality may support functions for a TPs, RP, or both. A gNB-DU 412 that includes TRP functionality does not need to offer cell services. To support positioning of a target UE and delivery of location assistance data to a UE with NG-RAN access in 5GS, location related functions are distributed as shown in the example architecture 400.

Figure 5:
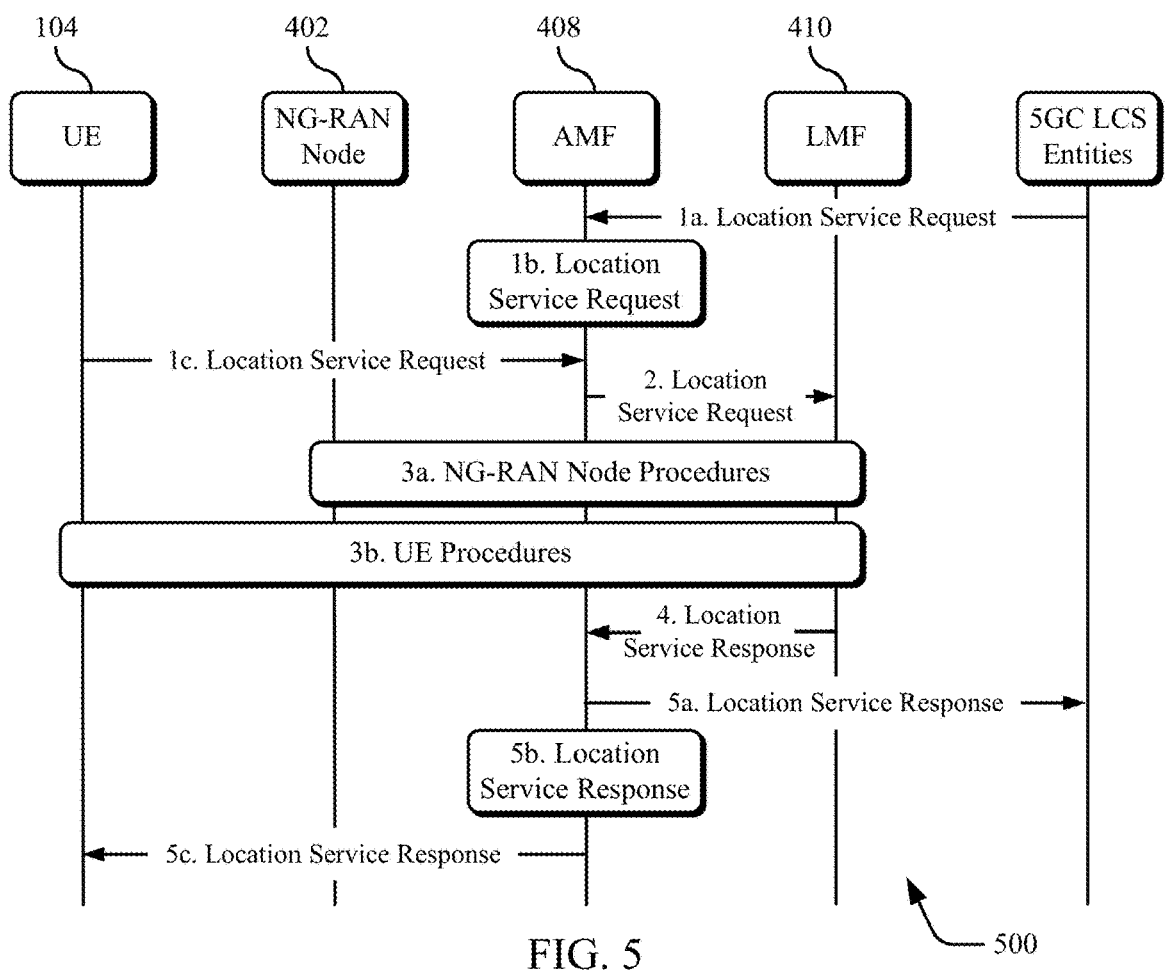
FIG. 5 illustrates an example signaling sequence applicable to NG-RAN for UE positioning as related to configuration and reporting in an NTN in accordance with aspects of the present disclosure.

FIG. 5 illustrates an overall sequence 500 of signaling events applicable to the UE 104, the NG-RAN 402, the AMF 408, and the LMF 410 for any location service. When the AMF 408 receives a location service request (LSR), and the UE 104 is in a connection management (CM)-idle state (CM-IDLE) state, the AMF 408 performs a network triggered service request in order to establish a signaling connection with the UE and assigns a specific serving gNB or next generation evolved NodeB (ng-eNB). The UE is assumed to be in a connected mode before the beginning of the signaling shown in the figure (i.e., signaling that may be needed to bring the UE to the connected mode prior to step 1a is not shown). However, the signaling connection may be later released, such as by the NG-RAN 402 node as a result of signaling and data inactivity while positioning is still ongoing. Additionally, the NG-RAN 402 node represents any combination of NTSs in an NTN, including a network architecture with a TN and NTN gNB, and/or a network architecture that is fully an NTN with NG-RAN architecture.

At step 1, either step 1a, step 1b, or step 1c is performed. At step 1a, an entity in the 5GC, such as a GMLC, requests a location service for positioning a target UE 104 to the serving AMF 408. Alternatively at step 1b, the serving AMF 408 for the target UE 104 determines the need for a location service (e.g. to locate the UE for an emergency call). Alternatively at step 1c, the UE 104 requests a location service, such as for the positioning or delivery of assistance data, to the serving AMF 408 at the non-access-stratum (NAS) level.

At step 2, the AMF 408 transfers the location service request to the LMF 410. At step 3a, the LMF 410 instigates location procedures with the serving and possibly neighboring next generation evolved NodeB (ng-eNB) or gNB in the NG-RAN 402, such as to obtain positioning measurements or assistance data. In addition to step 3a or alternatively (instead of step 3a), at step 3b, the LMF 410 instigates location procedures with the UE 104, such as to obtain a location estimate or positioning measurements, or to transfer location assistance data to the UE.

At step 4, the LMF 410 provides a location service response to the AMF 408 and includes any needed results, such as a success or failure indication and, if requested and obtained, a location estimate for the UE 104. At step 5a (if step 1a was performed), the AMF 408 returns a location service response to the 5GC entity in step 1a and includes any needed results, such as a location estimate for the UE 104. At step 5b (if step 1b occurred), the AMF 408 uses the location service response received in step 4 to assist the service that triggered this in step 1b, such as to provide a location estimate associated with an emergency call to a GMLC. At step 5c (if step 1c was performed), the AMF 408 returns a location service response to the UE 104 and includes any needed results, such as a location estimate for the UE.

In aspects of configuration and reporting in an NTN, the location procedures applicable to NG-RAN occur in steps 3a and 3b, which supports the configurations and reporting for communication between the LMF 410 and the UE 104 to enable non-terrestrial network (NTN) system level positioning. The steps 3a and 3b may involve the use of different positioning methods (also referred to herein as positioning techniques or positioning procedures) to obtain location related measurements for a target UE, and from these, the UE computes a location estimate and additional positioning assistance information.

Figure 6:
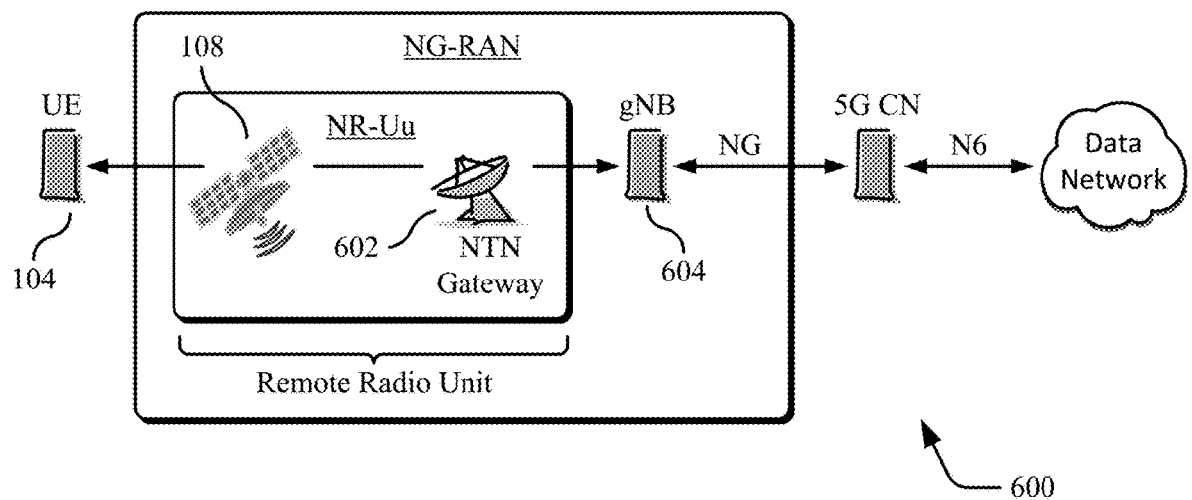
FIG. 6 illustrates an example transparent satellite-based NG-RAN architecture that supports configuration and reporting in an NTN in accordance with aspects of the present disclosure.

FIG. 6 illustrates a transparent satellite-based NG-RAN architecture 600. The satellite payload implements frequency conversion and a radio frequency amplifier in both the uplink and downlink directions, and it corresponds to an analogue RF repeater. Hence, the satellite (e.g., a NTS 108) repeats the NR-Uu radio interface from the feeder link, between the NTN gateway 602 and the satellite, to the service link between the satellite and the UE 104 (and vice-versa). The satellite radio interface (SRI) on the feeder link is the NR-Uu, meaning that the satellite does not terminate the NR-Uu radio interface. The NTN gateway 602 may support all of the necessary functions to forward the signal of the NR-Uu interface, and different transparent satellites may be connected to the same gNB 604 on the ground. Note that while several gNBs may access a single satellite payload, the illustration and description is simplified to the one gNB 604 accessing the satellite payload, without loss of generality.

Figure 7:
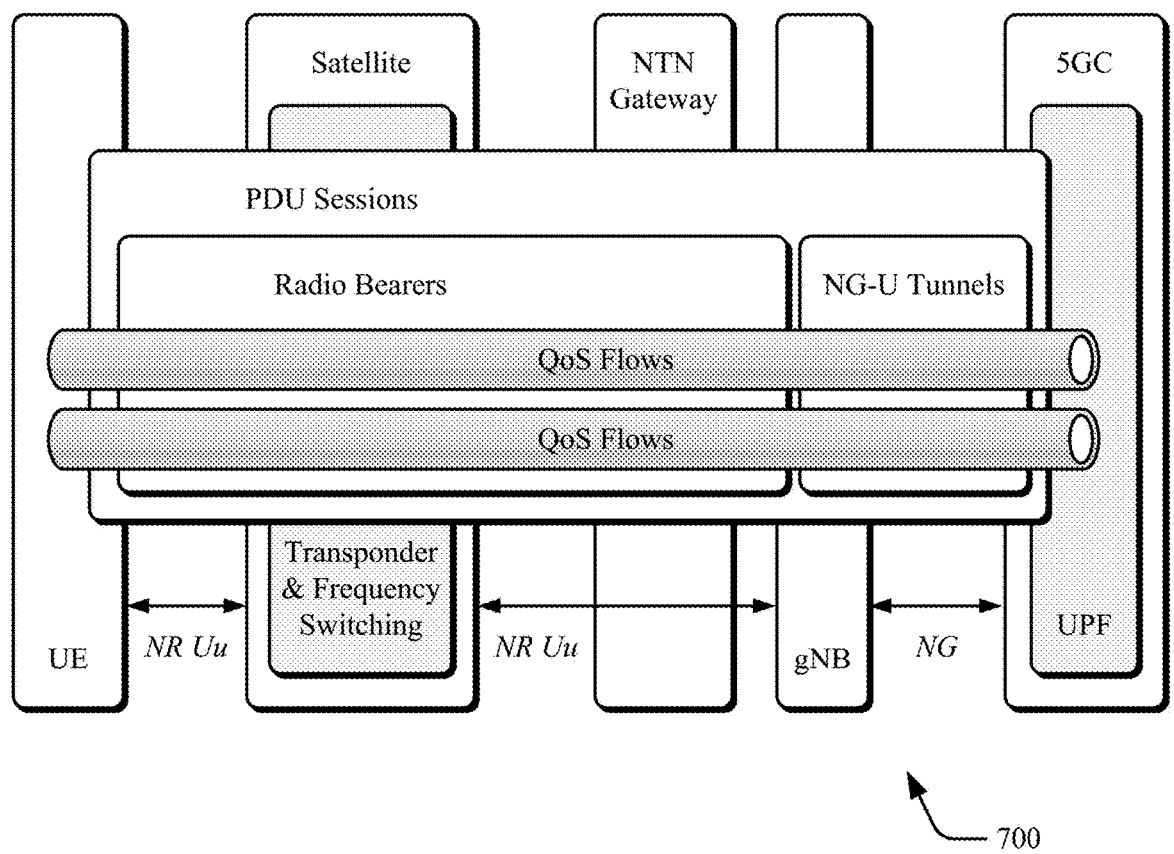
FIG. 7 illustrates an example of a transparent satellite-based NG-RAN architecture, adaptable for configuration and reporting in an NTN in accordance with aspects of the present disclosure.
Figure 8:
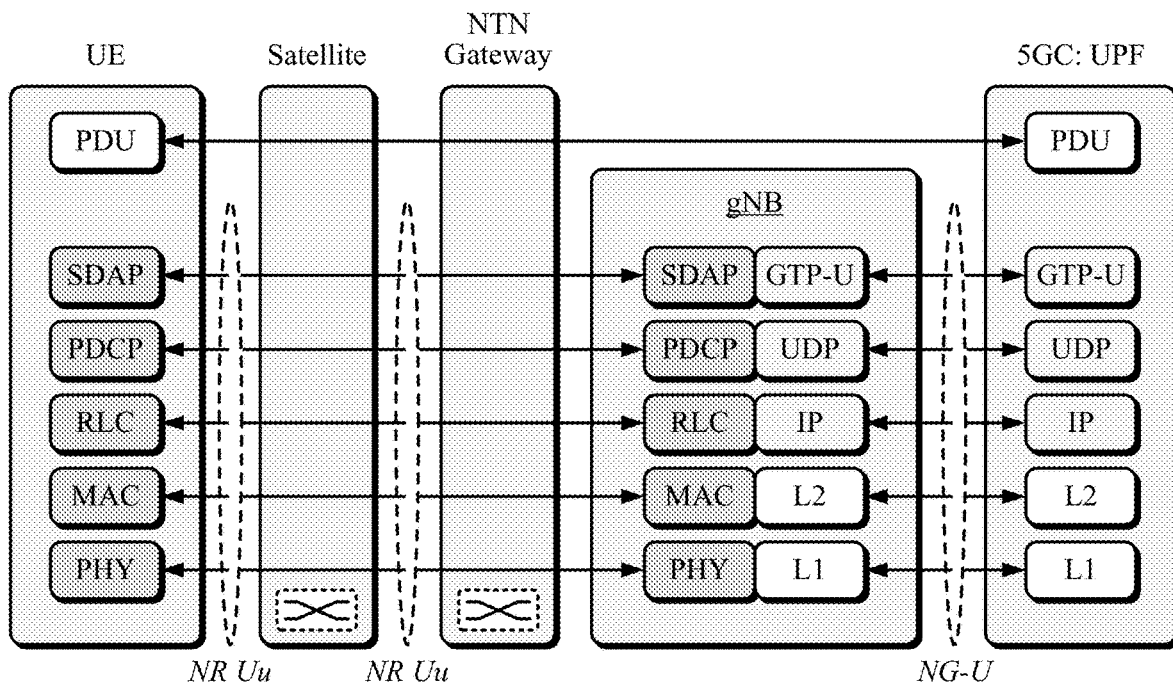
FIG. 8 illustrates an example of the UE user plane protocol stack for the transparent satellite-based NG-RAN architecture, adaptable for configuration and reporting in an NTN in accordance with aspects of the present disclosure.
Figure 9:
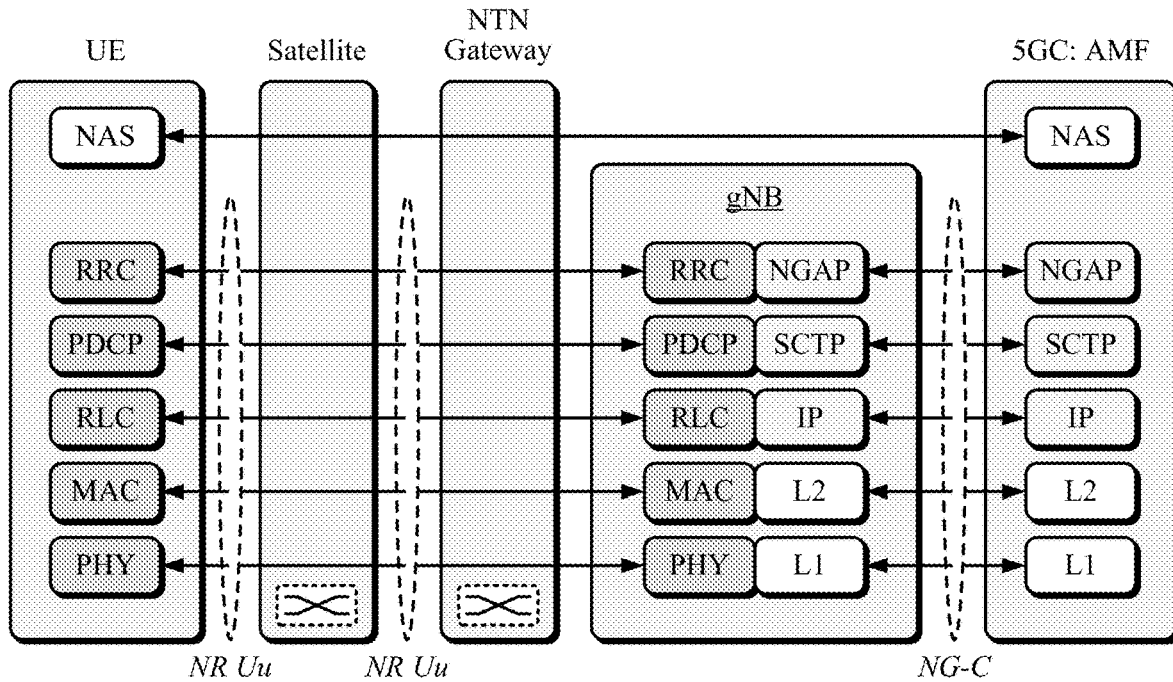
FIG. 9 illustrates an example of the control plane protocol stack for the transparent satellite-based NG-RAN architecture, adaptable for configuration and reporting in an NTN in accordance with aspects of the present disclosure.

FIG. 7 illustrates an example 700 of a transparent satellite-based NG-RAN architecture with mapping to quality of service (QOS) flows. The UE 104 has access to the 5G system via a 3GPP NR-based radio interface. FIG. 8 illustrates an example 800 of the UE user plane protocol stack for the transparent satellite-based NG-RAN architecture. The user data is transported between the UE 104 and the 5GC via the NTN gateway. FIG. 9 illustrates an example 900 of the control plane protocol stack for the transparent satellite-based NG-RAN architecture. The non-access stratum (NAS) (NAS-SM and NAS-MM) signaling from the UE 104 and the NG-AP signaling from the gNB are transported toward the 5GC and vice-versa.

Figure 10:
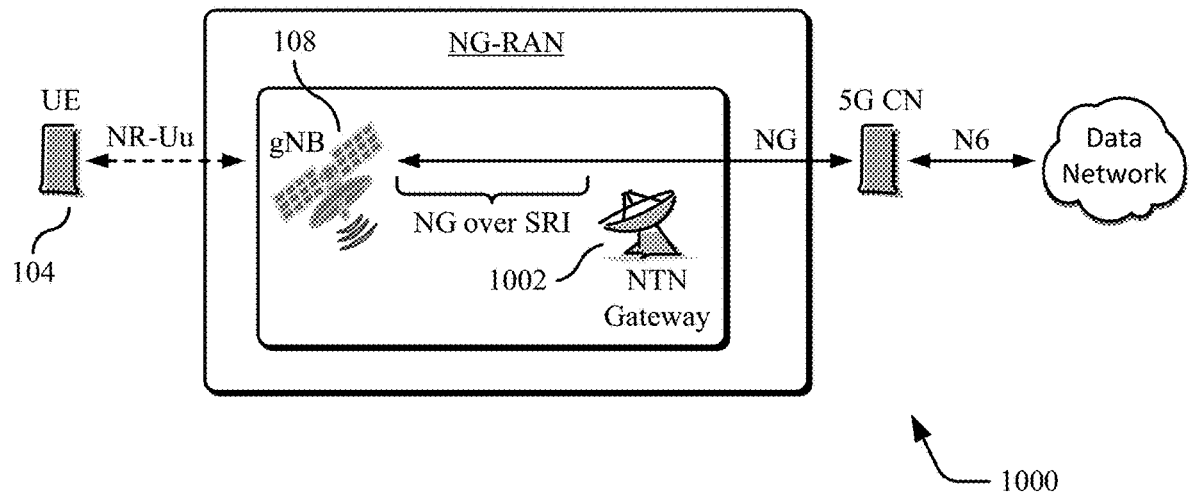
FIG. 10 illustrates an example regenerative satellite-based NG-RAN architecture that supports configuration and reporting in an NTN in accordance with aspects of the present disclosure.

FIG. 10 illustrates a regenerative satellite-based NG-RAN architecture 1000, such as a regenerative satellite without an inter-satellite link (ISL), and with a gNB-processed payload. The NG-RAN logical architecture may be used as baseline for NTN systems. The satellite payload implements regeneration of the signals received from ground-based network nodes. In this architecture 1000, the NR-Uu radio interface is implemented on the service link between the UE 104 and the satellite (e.g., a NTS 108), and the satellite radio interface (SRI) is implemented on the feeder link between the NTN gateway 1002 and the satellite. The satellite radio interface (SRI) is a transport link between the NTN gateway 1002 and the satellite.

Figure 11:
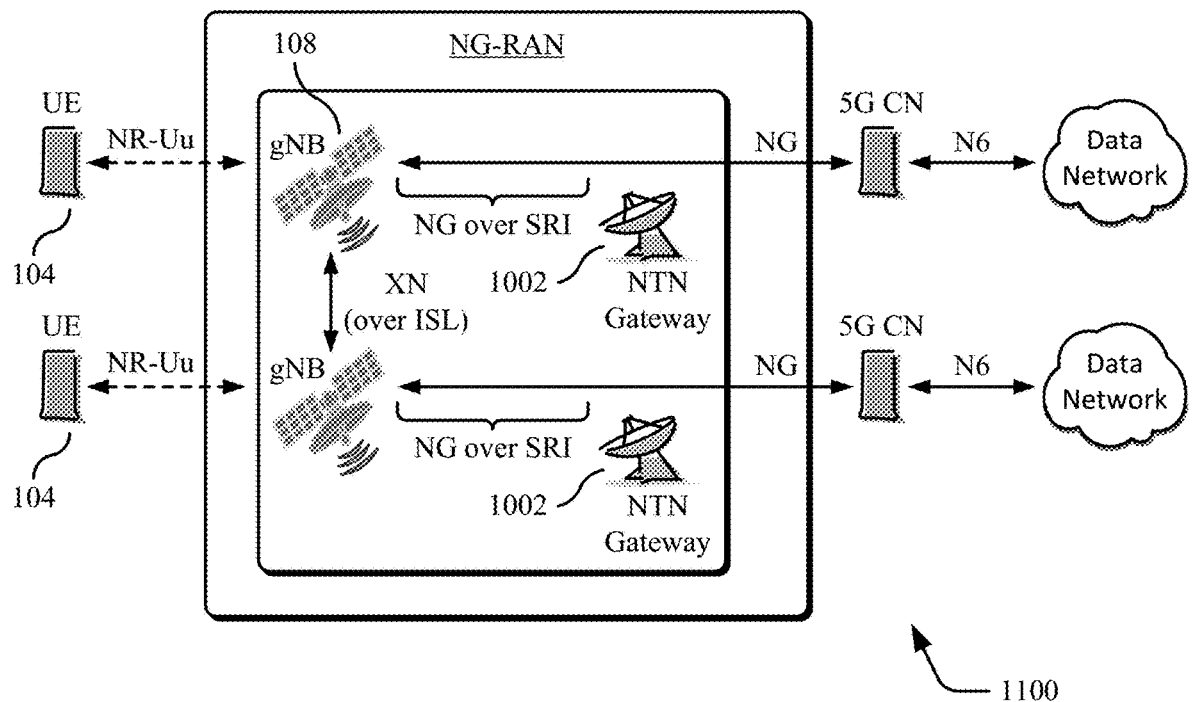
FIG. 11 illustrates another example regenerative satellite-based NG-RAN architecture that supports configuration and reporting in an NTN in accordance with aspects of the present disclosure.

FIG. 11 illustrates another example of a regenerative satellite-based NG-RAN architecture 1100, such as a regenerative satellite system with an inter-satellite link (ISL). The inter-satellite link (ISL) is a transport link, such as a radio interface or an optical interface, between satellites (e.g., NTSs 108). The NTN gateway 1002 is a transport network layer node, and supports all necessary transport protocols. In this architecture 1100, a UE 104 that is served by a gNB onboard a satellite could access the 5GCN via the inter-satellite link (ISL). In implementations, the gNB onboard different satellites may be connected to the same 5GCN on the ground, and if a satellite hosts more than one gNB, the same satellite radio interface (SRI) may be used to transport all the corresponding NG interface instances. In this architecture, the protocol stack of the satellite radio interface (SRI) is used to transport the UE user plane between a satellite and an NTN gateway 1002. The user protocol data units (PDUs) are transported over GTP-U tunnels between the 5GCN and the onboard gNB, via the NTN gateway 1002. The NG-AP is transported over SCTP, between the 5GCN and the onboard gNB via the NTN gateway. The NAS protocol is also transported by the NG-AP protocol, between the 5GCN and the onboard gNB, via the NTN gateway.

Figure 12:
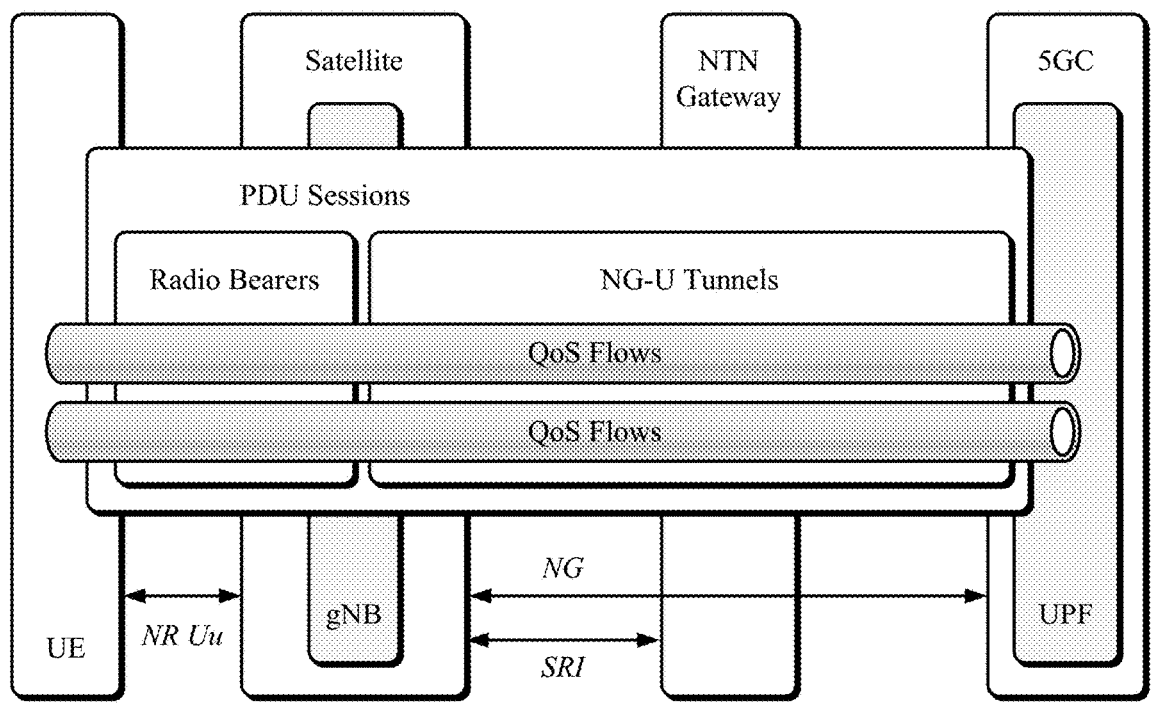
FIG. 12 illustrates an example of a regenerative satellite-based NG-RAN architecture with gNB onboard, adaptable for configuration and reporting in an NTN in accordance with aspects of the present disclosure.
Figure 13:
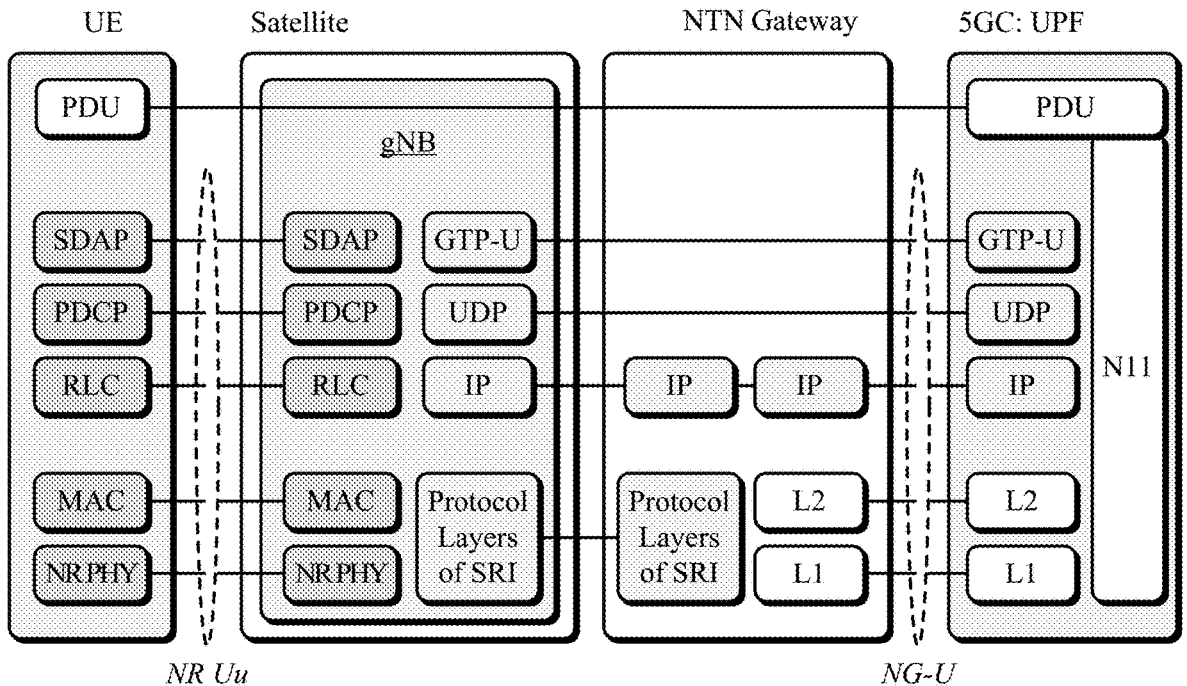
FIG. 13 illustrates an example of the UE user plane protocol stack for a protocol data unit (PDU) session, with respect to the regenerative satellite-based NG-RAN architecture with the gNB onboard, adaptable for configuration and reporting in an NTN in accordance with aspects of the present disclosure.
Figure 14:
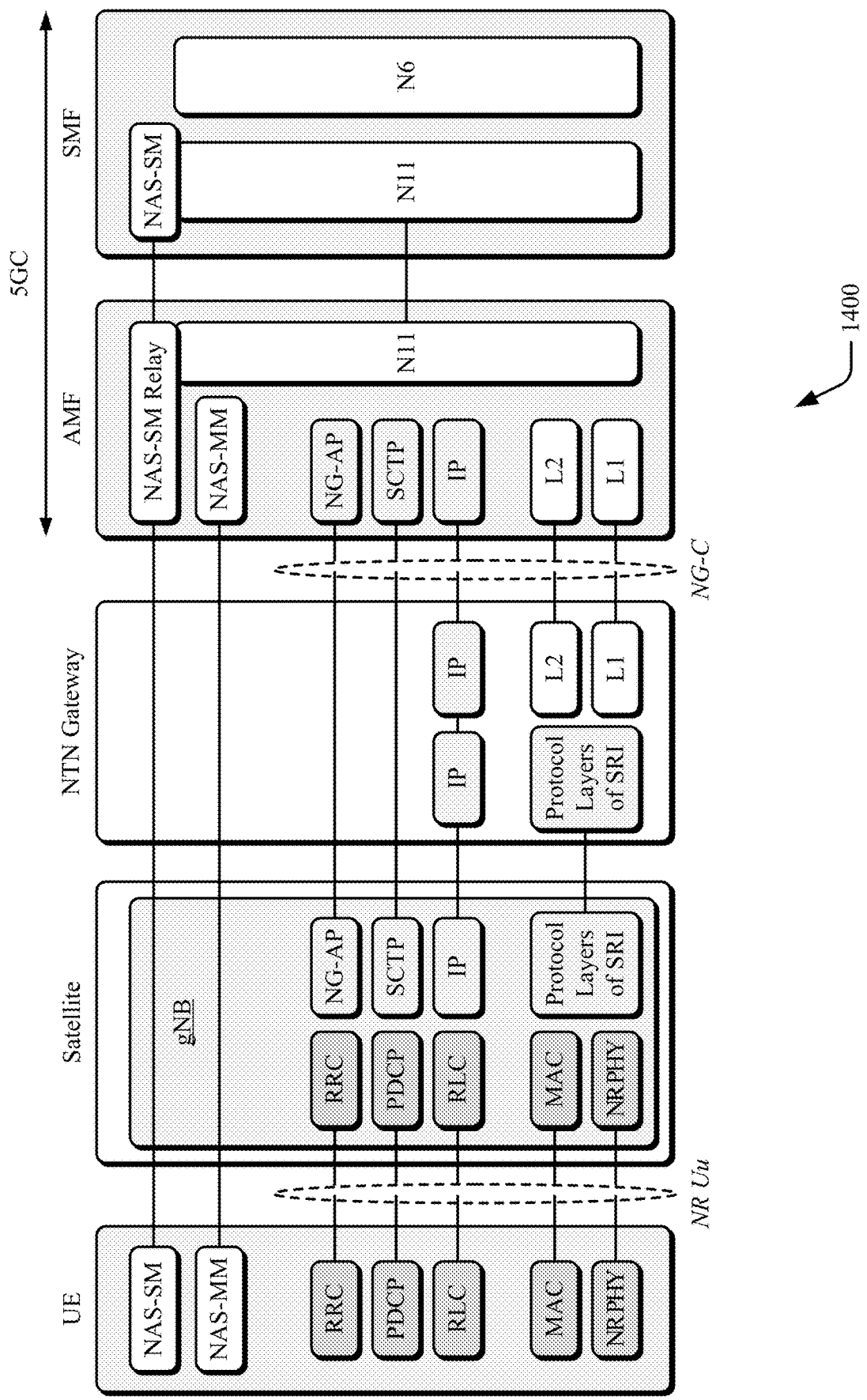
FIG. 14 illustrates an example of the UE control plane protocol stack for a PDU session, with respect to the regenerative satellite-based NG-RAN architecture with the gNB onboard, adaptable for configuration and reporting in an NTN in accordance with aspects of the present disclosure.

FIG. 12 illustrates an example 1200 of a regenerative satellite-based NG-RAN architecture with gNB onboard, and the quality of service (QOS) flows. FIG. 13 illustrates an example 1300 of the UE user plane protocol stack for a PDU session, with respect to the regenerative satellite-based NG-RAN architecture with the gNB onboard. The protocol stack of the satellite radio interface (SRI) is used to transport the UE user plane between the satellite and the NTN gateway. The user protocol data units (PDUs) are transported over GTP-U tunnels between the 5GC and the onboard gNB, via the NTN gateway. FIG. 14 illustrates an example 1400 of the UE control plane protocol stack for a PDU session, with respect to the regenerative satellite-based NG-RAN architecture with the gNB onboard. The NG-AP is transported over SCTP, between the 5GC and the onboard gNB, via the NTN gateway. The non-access stratum (NAS) protocol is also transported by the NG-AP protocol, between the 5GC and the onboard gNB, via the NTN gateway.

Aspects of the present disclosure include solutions to integrate NTN and location service (LCS) NG-RAN architectures that support accurate, reliable, and where applicable low-latency location services. The described techniques provide configuration, adaptation, and/or enhancements for performing third generation partnership project (3GPP) positioning via the NR NTN NG-RAN architecture. The techniques provide for an efficient location preparation phase procedure, including to provision assistance data and measurement configuration, designed for supporting NTN RAT-dependent positioning methods. Additionally, the described techniques provide for adapting the PRS physical layer configuration across the various, different RAT-dependent positioning techniques for an NTN supported network.

The described techniques also enable low-latency execution of the location measurement and reporting phase for a target UE in an NTN supported network. Further, the described techniques enable the request and response of NTN positioning capabilities between the location server that implements the LMF and a target UE. The LMF may also request capability information from satellite gNBs and associated gateways, and thereafter receive suitable responses from these network entities. Notably, any one or more of these described techniques may be implemented in combination to support NR positioning using the supported NTN interfaces, as well as the network entities and/or nodes.

As used herein, a positioning-related reference signal may refer to a reference signal used for positioning techniques, positioning procedures, positioning methods, and/or positioning purposes to estimate a location of a target UE. A reference signal may be a PRS, or based on existing reference signals, such as a SRS. A target UE can be referred to as the UE, device, or entity to be localized and/or positioned based on a positioning determination. A UE may be referred to as a target UE or as the UE of interest, for which the positioning is to be determined or calculated by a network entity or by the UE itself.

Notably, any of the positioning techniques described in the present disclosure may be implemented in combination with any additional positioning techniques described in the related disclosures: U.S. patent application Ser. No. 17/554,916 entitled "Positioning in a Non-Terrestrial Network" filed Dec. 17, 2021; U.S. patent application Ser. No. 17/554,689 entitled "Signal Isolation using Polarization in a Non-Terrestrial Network" filed Dec. 17, 2021; and U.S. patent application Ser. No. 17/555,164 entitled "Positioning Capability Data Exchange in a Non-Terrestrial Network" filed Dec. 17, 2021, the full disclosures of which are incorporated by reference herein in their entirety.

The described techniques for location configuration protocol enhancements provide enhanced solutions to improve the location and configuration preparation phase for a target UE (or group of target UEs) in an NTN, given that the propagation delays associated with transmitting and receiving positioning related signals (such as PRSs) and positioning messages are potentially orders of magnitude longer than those of ground cellular systems, referred to as terrestrial networks (TNs). Additionally, the PRS configuration parameters are adapted to consider the different aspects of the NTN system including satellite mobility, propagation times, and large cell coverage by NTN systems. The location preparation phases primarily include the necessary capability message exchange, which can be static or variable, as well as the configuration of assistance data for downlink (DL)-based and/or uplink (UL)-based positioning.

Figure 15:
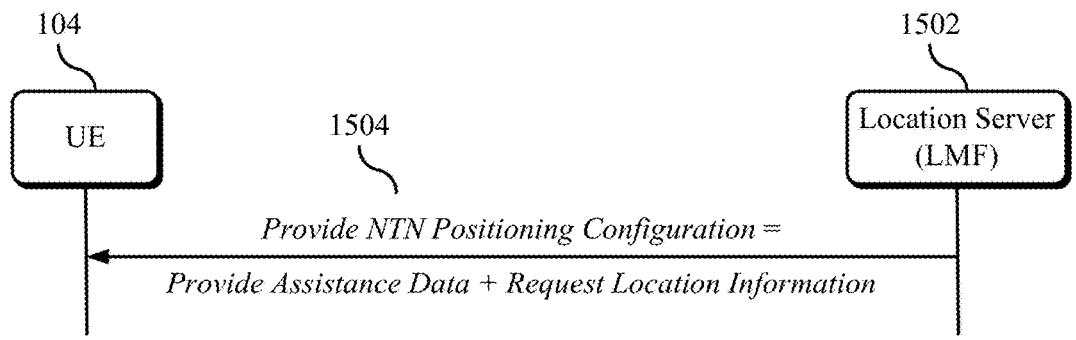
FIG. 15 illustrates an example of signaling between network devices as related to configuration and reporting in an NTN in accordance with aspects of the present disclosure.

FIG. 15 illustrates an example 1500 of signaling between network devices that supports configuration and reporting in an NTN in accordance with aspects of the present disclosure. In this example 1500, a location server 1502 that implements the LMF 410 communicates (e.g., transmits) a combined LTE positioning protocol (LPP) message to a UE 104. The combined LPP message enables both configuration and a request for measurements at the UE. With conventional signaling, the UE receives a PRS configuration from the LMF (e.g., the location server 1502) as the ProvideAssistanceData LPP message that configures the resources for the UE to perform the required measurements within a designated duration of time. The UE also separately receives the RequestlocationInformation LPP message from the LMF to trigger the UE to provide the measurement report according to a particular positioning technique and associated metrics or location estimates. However, due to the propagation delays inherent with an NTN, these messages are combined so that the UE receives both configuration of PRS resources, as well as the information indicating what measurements to report, as the new combined ProvideNTNConfiguration message 1504.

In existing systems, the assistance data configuration and measurement configuration transmitted from a location server 1502 that implements the LMF to the target UE 104 are transmitted by using the two LPP messages ProvideAssistanceData and RequestLocationInformation. The ProvideAssistanceData LPP message configures the required downlink PRS resources, and the RequestLocationInformation LPP message triggers and configures the type of measurements to be reported to the LMF. However, due to the extended propagation delay between the target UE and either a satellite gNB or a gateway, the location of the target UE may no longer be valid at the time that a positioning message originated from the target UE reaches the LMF (or a location management component (LMC) at the network and/or gateway side).

The solution of this positioning technique includes the location server 1502 that implements the LMF transmitting both the assistance data and the request for measurements in the same LTE positioning protocol (LPP) message as soon as the measurements have been processed and are available for reporting. The LMF can configure the type of measurements to be reported based on the supported RAT-dependent positioning techniques, such as DL-TDoA, Multi-RTT, DL-AOD, UL-TDoA, UL-AoA, or combinations thereof within the new consolidated ProvideNTNConfiguration message 1504. In an extended implementation, the supported positioning techniques to be configured may include RAT-independent positioning methods, such as WLAN positioning, Bluetooth positioning, IMU sensor positioning, or combinations thereof.

In an alternative implementation, the partial or full set of LMF functionalities may be co-located or embedded within a gNB (e.g., by using a location management unit (LMU) or a location management component (LMC)). The NTN configuration can then be configured by the base station or a co-locating positioning entity. Notably, the LMF can be implemented and resides in the core network (e.g., at the location server), and/or can be implemented closer to the NG-RAN architectures. Additionally, the UE-initiated and/or LMF-initiated on-demand request for the NTN configuration can also be supported, which is applicable to both UE-based and UE-assisted positioning procedures. The UE-initiated and/or the LMF-initiated on-demand request may be based on a request to update the available assistance information at the UE. The combined LTE positioning protocol (LPP) message can be requested by the UE, or initiated by the LMF in the core network. The LMF can initiate the request from the gNB, depending on where gNB is located in the NTN system (e.g., whether UE-based or UE-assisted).

The combined LPP message, ProvideNTNConfiguration may comprise configuration parameters for PRS transmissions originating from an NTN gNB, from a TN gNB, or a combination thereof, as well as the required positioning measurements that are reported to the LMF. The configuration parameters may include any one or more of the following assistance data to configure the PRS: Time and/or frequency resources for transmission. Muting pattern configurations where the LMF can mute a gNB transmission by configuring for zero transmit power. Transmission power for a reference signal, such as a PRS. Resource indications and other parameters for repetition of PRS transmission including the time gap between repetitions. PRS PRS (or other reference signal) periodicity and slot offset to periodically transmit the PRS. The number of PRS symbols to be transmitted. The PRS comb size and offset (e.g., as a number of resource elements with a specific subcarrier spacing) for PRS transmissions. A second part of the combined LPP message includes activation to report the measurements based on the positioning techniques, including any one or combination of downlink time difference of arrival (TDOA), multi-RTT, DL-AoD, and/or other types of positioning techniques. The configuration parameters may also include measurement quality indications, such as timing quality and multipath metrics.

In an implementation, the NTN positioning system information may be applicable to one or more NTN cells (i.e., a group of cells) and may be a function of the mobility of the NTN satellite system and/or UE. In an NTN with earth-fixed cells, where a cell may disappear as the satellite approaches the horizon from the cell's viewpoint, the cells that are approximately equally likely to be operational for a certain period of time may be grouped and sent an identical positioning configuration. A gNB can broadcast the configuration information as the common message to a group of UE for a more efficient signaling of common assistance data and measurement configuration applicable to the group of UE. As such, the positioning system information blocks (posSIBs) may comprise a field or parameter indicating which assistance data is applicable to all or a subset of the UE in a given NTN area or cell. In an NTN with earth-moving cells, where UE at cell edges are more likely to fall out of the cell boundaries as the satellite moves, the UE that are approximately equally likely to stay in the cell for a certain period of time may be grouped and sent an identical assistance data configuration.

Table T4 includes proposed, new positioning system information blocks (posSIBs) (e.g., "Type6-X" and "Type6-Y") for UE performing positioning in an NTN supported network for the UE performing DL-TDOA, which is applicable to UEs operating in RRC_IDLE, RRC_INACTIVE, and RRC_CONNECTED states. The new positioning system information blocks (posSIBs) are also identified with "NTN" to indicate the configuration for an NTN. Alternatively, existing positioning system information blocks (posSIBs) may be used for the positioning technique.

TABLE T4

Proposed new posSIBs for Reference Device

| NR DL-TDOA/ | posSibType6-1 | NR-DL-PRS-AssistanceData |
|---|---|---|
| DL-AoD | posSibType6-2 | NR-UEB-TRP-LocationData |
| Assistance | posSibType6-3 | NR-UEB-TRP-RTD-Info |
| Data (DL-only | posSibType6-X | NR-DL-PRS-NTN-AssistanceData |
| measurements) | posSibType6-Y | NR-UEB-NTN-PositioningConfiguration |

In an extended implementation, the posSIB assistance data or NTN positioning configuration may be configured per positioning method and applicable to PRS assistance data. In other implementations, SRS assistance data (if not configured via RRC signaling), (e.g., separate posSIB for configured methods such as Multi-RTT, DL-AoD, UL-RTOA, UL-AoA). In addition, some or all the information in posSIB may be requested in an on-demand signaling method by using, e.g., on-demand system information (SI) request or via a specific on-demand PRS request via the LPP RequestAssistance Data message.

In an implementation, the NTN assistance data and/or the NTN positioning configuration may be preconfigured and/or pre-defined for on-demand PRS configurations, where an NTN PRS configuration that may have been sent at an earlier time is updated. The preconfigured assistance data may be activated, modified, and/or deactivated using LPP/RRC/DL MAC CE signaling. In another implementation, the preconfigured assistance data may associated with explicit or implicit validity criteria, including an area and/or a group of NTN and/or TN cells; an expiration timer of preconfigured assistance data; and/or NTN mobility of an NTN gNB depending on if it is in-coverage or out-of-coverage.

The PRS pre-configuration, or pre-defined and/or default configuration sets, may have an associated identifier that enables the UE to associate the measurements to corresponding assistance data. This same identifier can also be reported to the LMF via the positioning measurement report. In addition, the measurement reporting associated with the assistance data may be mapped according to the identifier. Different PRS pre-configuration, or pre-defined and/or default configuration sets, may have an associated identifier, while in other instances, groups of similar PRS pre-configuration, or pre-defined and/or default configuration sets, may be grouped and given a common identifier by the LMF. Similar PRS pre-configuration, or pre-defined and/or default configuration sets, with a similar grouping identifier may comprise overlapping or similar values for some or all parameters within a relatively small margin. This margin (e.g. 1%, 2%, 5%, etc.) may be signaled to the LMF.

Figure 16:
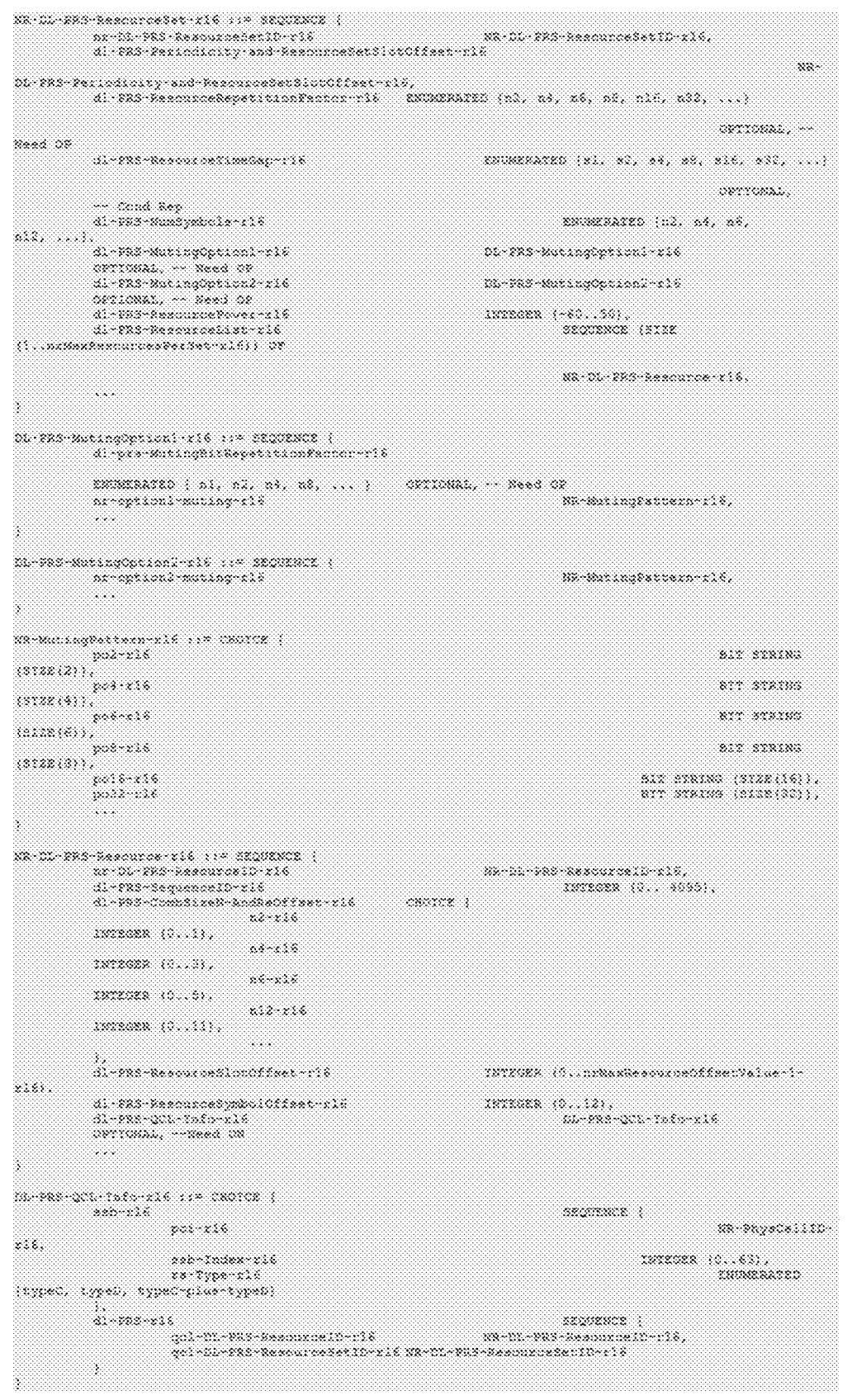

FIG. 16 illustrates an example 1600 of ASN.1 code for new radio downlink positioning reference signal (NR-DL-PRS)-information. Aspects of the present disclosure include common PRS configuration enhancements, and several parameters can be configured for the downlink PRS, including periodicity and muting options. One purpose for these parameters is to avoid interference by downlink positioning reference signals (PRSs) transmitted from different gNBs (base stations). In an NTN, particularly in LEO and MEO satellite systems, the movement of a satellite relative to another satellite may not result in interference patterns that change over time. For example, two satellite gNBs may not interfere at one point in time and/or location, but they may interfere at another point in time and/or location. Furthermore, the difference between propagation delays from different satellites may be significant, hence resulting in drifting patterns when observed by a UE on the ground.

In some implementations, PRS pattern parameters (e.g., for muting or comb pattern) may be configured to change over time in order to avoid interference in the presence of drifting patterns when observed by a UE. A PRS periodicity may be variable as a function of time. For example, a first value of periodicity P1 may be indicated for a time interval t1 to t2, a second value of periodicity P2 may be indicated for a time interval t3 to t4, and so on. Additionally, the periodicity may also be a function of the configured subcarrier spacing.

In aspects of these PRS configuration enhancements, a configuration entity, such as the LMF of a central unit (CU), can receive information related to drifting patterns or drifting rates from one or multiple satellites as observed by a UE. This information may comprise ephemeris of each of the one or multiple satellites, which includes parameters for determining the location, velocity, and/or trajectory of the movement of each of the one or multiple satellites, as well as the location of the UE. In the case of a UE onboard an aircraft, a velocity and/or movement trajectory of the UE may also be sent to the LMF. Alternatively, a reference point may be considered instead of the location of the UE. The reference point may be a center point associated with a cell, and if the cell is an earth-fixed cell, the center point may be considered fix for a period of time. Otherwise, if the cell is an earth-moving cell, the center cell or reference point may be considered moving. The cell may be associated with each of the one or multiple satellites, associated with another satellite, or provided by a ground TN base station.

In this implementation, any of the related information, such as a trajectory of the reference point movement, as well as whether the cell is an earth-fixed cell or an earth-moving cell, may be provided to the CU to be used for producing and sending the configuration. Once the UE receives the PRS configuration, it can apply the first value of periodicity P1 for receiving the PRS in the time interval t1 to t2, the second value of periodicity P2 for receiving the periodicity t3 to t4, and so on. In another implementation, a PRS periodicity may be variable as a function of location. For example, a first value of periodicity P1 may be indicated for a location in zone Z1, a second value of periodicity P2 may be indicated for a location in zone Z2, and so on. Each geographical zone Z1 may be defined by 3D ephemeris, 2D projection of the satellite ephemeris on the earth, and the like. A geographical zone may be indicated as a rectangle with X and Y coordinates, as well as a radius R from a center location C.

A configuration entity, such as the LMF or a CU may receive information related to drifting patterns or drifting rates from one or multiple satellites as observed by a UE. This information may comprise ephemeris of each of the one or multiple satellites, with parameters indicating the location and/or trajectory of the movement of each of the one or multiple satellites. The LMF and/or CU may further receive information as to, or alternatively configure, whether cells associated with the one or multiple satellites are earth-fixed cells or earth-moving cells. Once the UE receives the PRS configuration, it obtains a location of the UE, which may be a latest location computed based on an NTN positioning method or an approximate location. The UE then applies the first value of periodicity P1 for receiving the PRS if the location is in zone Z1, applies the value of second periodicity P2 if the location is in zone Z2, and so on.

In another implementation, the PRS periodicity may be variable as a function of the number of other satellite gNBs (base stations) in a vicinity. This is useful when the density of satellites is variable, such as in constellations with LEO satellites closer to each other near the poles, but farther from each other near to the equator. In one example, a first periodicity P1 may be indicated for a number of satellites in the vicinity smaller than a threshold N, a second periodicity P2 may be indicated for a number of satellites in the vicinity equal to or greater than the threshold N, and so on.

In applications, the number of satellites in the vicinity may be determined by a measurement by the gNB (base station) (e.g., an inter-satellite measurement), a measurement by the UE (e.g., the UE reporting the number of satellites in range to the serving satellite gNB), a signaling between satellites (e.g., a signaling on the inter-satellite link (ISL)), or a formula known to the satellite gNB (base station) that computes the expected number of other satellite gNBs (base station) in a vicinity. In any case, the "vicinity" may be defined, determined, and/or indicated based on a geographical location, such as based on a range of distances, or a signal strength from the satellite gNB (base station), such as a reference signal received power (RSRP).

In another implementation, a PRS periodicity may be different for different beams. This is particularly useful when different beams are used by the satellite gNB (base station) to cover different geographical areas, which may then experience a different number of satellites interfering or drifting in terms of PRS resource patterns. An association with a beam may be indicated by a references signal identifier (RS ID) or a quasi co-location (QCL) relationship. Alternatively, an association with a beam may be indicated indirectly through indication of bandwidth part (BWP), which may be realized in configurations where there are associations between beams and bandwidth parts (BWPs), such as when there is a one-to-one indication between beams and the bandwidth parts (BWPs). In an example, a first periodicity P1 may be indicated for a beam B1 and/or a bandwidth part (BWP) W1, a second periodicity P2 may be indicated for a beam B2 and/or bandwidth part (BWP) W2, and so on.

As another alternative, a PRS periodicity may be associated with a polarization such as left hand circular polarized (LHCP), right hand circular polarized (RHCP), linear, and so on. In another implementation, a PRS periodicity may be variable as a function of Doppler shift for a signal, such as a reference signal. This is particularly useful when a Doppler measurement is used as an indication of drifting resource patterns for a PRS. The Doppler shift may be measured on a reference signal from a UE, such as a SRS. In one example, a first periodicity P1 may have a Doppler shift range of D1, a second periodicity P2 may have a Doppler shift range of D2, and so on.

In other implementations, a muting option and/or pattern may be variable, as in the following example implementation. A PRS muting option and/or pattern may be variable as a function of time, such as a first muting option and/or pattern M1 having a time interval t1 to t2, a second muting option and/or pattern M2 having a time interval t2 to t3, and so on. In this implementation, a configuration entity, such as the LMF or a CU may receive information related to drifting patterns or drifting rates from one or multiple satellites as observed by a UE. This information can include ephemeris information for each of the one or multiple satellites, which may comprise parameters determining the location and/or trajectory of the movement of each of the one or multiple satellites, as well as the location of the UE.

Alternatively, instead of the location of the UE, a reference point may be considered. The reference point may be a center point associated with a cell, and if the cell is an earth-fixed cell, then the center point may be considered fixed for a time interval. Otherwise, if the cell is an earth-moving cell, then the moving center cell or reference point may be considered. The cell may be associated with each of the one or multiple satellites, associated with another satellite, or provided by a ground TN base station. In this implementation, any or all or the related information, such as a trajectory of the reference point movement, as well as whether the cell is an earth-fixed cell or an earth-moving cell, may be provided to the LMF and/or CU and used to produce and send the configuration. When the UE receives the PRS configuration, it can apply the first muting option and/or pattern M1 for receiving the PRS in the time interval t1 to t2, the second muting option and/or M2 for receiving the periodicity t2 to t3, and so on.

FIG. 17 illustrates an example 1700 of a configuration according to the described implementation. In this configuration, the ASN.1 code includes the example parameters 1702 for dl-PRS-MutingOption1-r18 and dl-PRS-MutingOption1-r18 as a series (sequence) of muting options and an associated expiration timer. The expiration timer may be implemented as a first timer starting from a moment t1 when the configuration is received or updated, and the first timer continues until t2:=t1+T1, wherein T1 is indicated by a first expiration timer. During the time interval from t1 to t2, a first value of a muting option is applied. Next, a second timer runs from time t2 until t3:=t2+T2, wherein T2 is indicated by a second expiration timer. During the interval from t2 to t3, a second value of the muting option is applied. This continues for all the values of muting options and their associated expiration timer values. Additionally, the lower-layer signaling (e.g., DCI and/or MAC CE signaling) may be used to determine a beginning time or an ending time of an expiration timer.

In an implementation, a PRS muting option and/or pattern may be variable as a function of location. In one example, a first muting option and/or pattern M1 may be indicated for a location in zone Z1, a second muting option and/or pattern M2 may be indicated for a location in zone Z2, and so on. Each geographical zone Z1 may be defined by 3D ephemeris, 2D projection of the satellite ephemeris on the earth, and the like. A geographical zone may be indicated as a rectangle with X and Y coordinates, and a radius R from a center location C. In this implementation, a configuration entity such as the LMF or CU can receive information related to drifting patterns or drifting rates from one or multiple satellites as observed by a UE. This information can include ephemeris information for each of the one or multiple satellites, which may comprise parameters determining the location and/or trajectory of the movement of each of the one or multiple satellites. The LMF and/or CU can further receive information of, or may alternatively configure, whether cells associated with the one or multiple satellites are earth-fixed cells or earth-moving cells. Once the UE receives the PRS configuration, it obtains a location of the UE, which may be a latest location computed based on an NTN positioning method or an approximate location. Then, the UE applies the first muting option and/or pattern M1 for receiving the PRS if the location is in zone Z1, applies the second muting option and/or pattern M2 if the location is in zone Z2, and so on.

Figure 18:
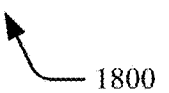
FIG. 18 illustrates an example of downlink configuration positioning information parameters as related to configuration and reporting in an NTN in accordance with aspects of the present disclosure.

FIG. 18 illustrates an example 1800 of a configuration according to the described implementation. In this configuration, the ASN.1 code includes the example parameters 1802 for dl-PRS-MutingOption1-r18 and dl-PRS-MutingOption1-r18 as a series (sequence) of muting options and associated validity zones. The validity zone for each muting option and/or pattern can include a geographical zone, for example by indicating a center and a radius, in which the associated muting option and/or pattern is valid. Additionally, the lower-layer signaling (e.g., DCI and/or MAC CE signaling) may be used to determine a validity zone for a muting option/pattern. In another implementation, a PRS muting option and/or pattern may be variable as a function of the number of other satellite gNBs in a vicinity. This is useful when the density of the satellites is variable, such as in constellations with LEO satellites closer to each other near the poles, but farther from each other near to the equator. In one example, a first muting option and/or pattern M1 may be indicated for a number of satellites in the vicinity smaller than a threshold N, a second muting option and/or pattern M2 may be indicated for a number of satellites in the vicinity equal to or greater than the threshold N, and so on.

In implementations, the number of satellites in the vicinity may be determined as a measurement by the gNB (base station) (e.g., an inter-satellite measurement); as a measurement by the UE (e.g., the UE reporting the number of satellites in range to the serving satellite gNB (base station)); as a signaling between satellites (e.g., a signaling on the inter-satellite link (ISL)); or as a formula by the satellite gNB (base station) that computes the expected number of other satellite gNBs (base stations) in a vicinity. In any case, the "vicinity" may be defined, determined, and/or indicated based on a geographical location, such as a range of distances, or a signal strength from the satellite gNB (base station), such as an RSRP.

In another implementation, a PRS muting option and/or pattern may be different for different beams. This can be useful when different beams are used by the satellite gNB (base station) to cover different geographical areas, which may then experience different number of satellites interfering or drifting in terms of PRS resource patterns. An association with a beam may be indicated by a reference signal identifier (RS ID) or a quasi co-location (QCL) relationship. Alternatively, an association with a beam may be indicated indirectly through a bandwidth part (BWP) which may be realized in configurations where there are associations between beams and bandwidth parts (BWPs), such as when there is a one-to-one indication between the beams and the bandwidth parts (BWPs). In one example, a first muting option and/or pattern M1 may be indicated for a beam B1 and/or bandwidth part (BWP) W1, a second muting option and/or pattern M2 may be indicated for a beam B2 and/or bandwidth part (BWP) W2, and so on. Alternatively, a PRS periodicity may be associated with a polarization such as left hand circular polarized (LHCP), right hand circular polarized (RHCP), linear, and so on.

In another implementation, a PRS muting option and/or pattern may be variable as a function of Doppler shift for a signal, such as a reference signal. This is useful when a Doppler measurement is used as an indication of drifting resource patterns for a PRS. The Doppler shift may be measured on a reference signal from a UE, such as a SRS. In one example, a first muting option and/or pattern M1 may be indicated for a Doppler shift range of D1, a second muting option and/or pattern M2 may be indicated for a Doppler shift range of D2, and so on. Other PRS resource parameters may also be variable, as further described below. Alternatively, the PRS periodicity or muting patterns may be variable, however the values of the parameters are not all provided by the LMF. Instead, a variable parameter may be indicated by a location management component (LMC), where the value signaled by the location management component (LMC) can then override any default or initial value configured by the LMF.

The dynamic signaling for variable PRS resource parameters, as proposed in aspects of the disclosure, are particularly practical when each location management component (LMC) is connected to a gateway or satellite gNB (base station) or gNB (base station) CU (gNB-CU) that stores information of the local traffic, hence updating the traveling gNB (base station) satellite with new parameter values as a function of the number of interfering satellite gNBs (base stations) in the vicinity. In some implementations, a similar method proposed for variable periodicity or muting options may apply to measurement gaps, which may be preconfigured, in order to compensate for the drifting issue with measurement gaps received from different satellite gNBs (base stations). The drift occurs due to relative movement between satellite gNBs (base stations) and the variable propagation delays that the movements cause. In an extended implementation, multiple measurement gaps can be configured with variable measurement gap lengths, and measurement gap repetition periods that take into account the PRS transmissions from a number of NTN satellites to be measured, as well as propagation time delay from each of the satellites.

Additionally, the measurement gaps may be preconfigured to the UE and can be activated or deactivated depending on several factors, such as duration of the measurements, expected timing of the measurements, the number of positioning measurements, NTN satellite mobility, latency, or a combination thereof. In other implementations, a dedicated measurement gap solely for measuring PRSs may be configured, while in other cases, the measurement gap may be shared along with radio resource management (RRM) measurements (e.g., synchronization signal block (SSB) measurement timing configuration (SMTC) configuration).

Alternatively, the positioning reference measurements from NTN satellites may also be performed outside of a measurement gap, subject to a prioritization window configuration with respect to other downlink signals and/or channels (e.g. other reference signal data channels), as well as the propagation delay depending on the deployed NTN architecture. In another implementation, and due to the extended propagation time delays, the LMF may also configure a measurement time window specific to NTN supported positioning methods. The NTN measurement window may be defined by a start time, system frame number (SFN 0), a measurement window length (time duration), periodicity, and/or repetition factor. The LMF can configure this measurement window to the UE in advance for performing the PRS measurements, and to correct for time drifts and/or clock biases, including downlink RSTD, PRS RSRP, and UE Rx-Tx time difference measurements.

In another implementation, the LMF may also configure explicit or implicit prioritization of a PRS to be measured based on NTN or TN transmissions. For example, explicit indications of priority may include an integer association from one to five (1 to 5), where one (1) is the highest priority and five (5) is the lowest priority PRS to be measured. The example implicit indications of priority may include the list or index ordering of a PRS in assistance data. The priority indication can be applicable across different granularities of a PRS, including across frequency layers, TRPs, a resource set, and resources. This assists the UE in measuring the desired PRS resources according to the location server requirements.

The described techniques for location configuration protocol enhancements include location measurement reporting for an NTN, and provides enhancements to perform RAT-dependent positioning measurements, as well as the UE reporting of processed positioning measurements and/or location estimates to the LMF (e.g., as implemented by the location server). The LMF can configure a response time to a target UE, indicating a duration as to when the LMF can expect the positioning measurement report from the UE in a best-effort manner. Given that the propagation delay between the target UE and the LMF in the NTN may be orders of magnitude larger than those in a TN (e.g., terrestrial cellular networks), recommended response times are relaxed to accommodate these extended signaling durations.

Figure 19:
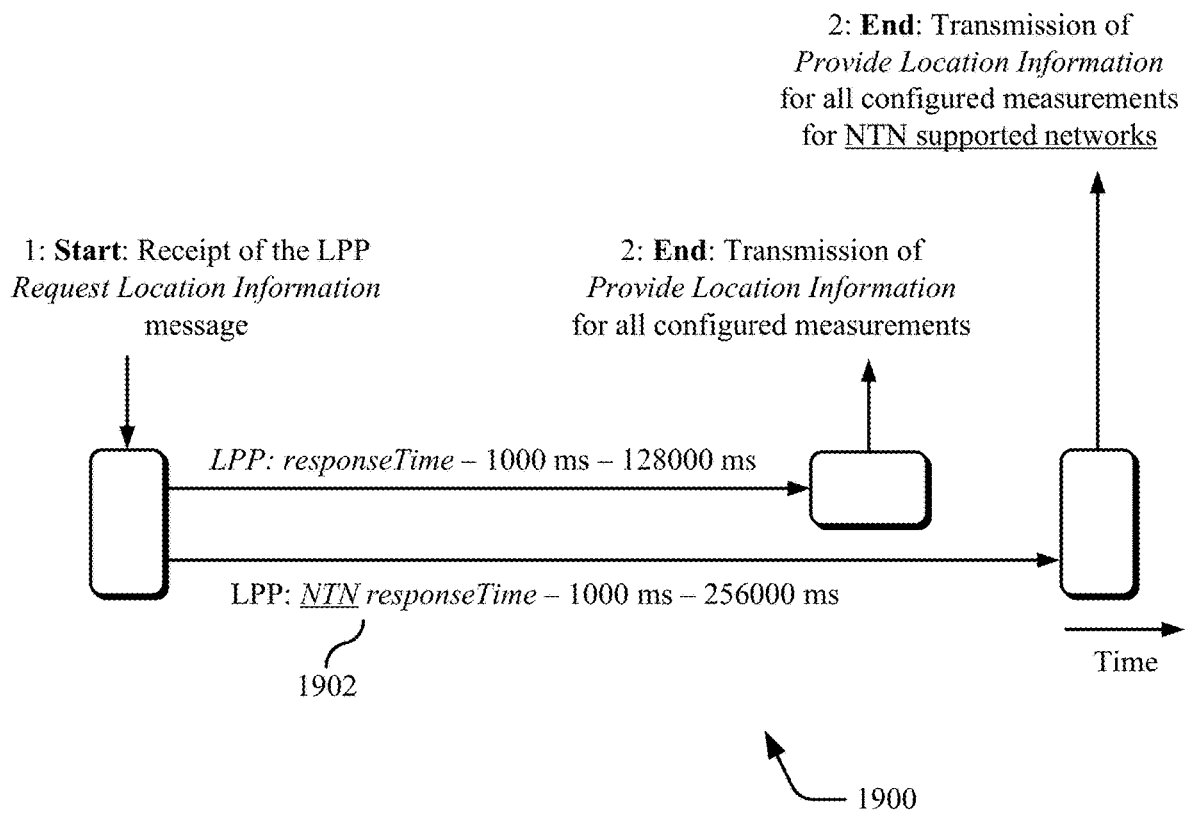
FIG. 19 illustrates an example of a LMF configured NTN response time for a measurement report as related to configuration and reporting in an NTN in accordance with aspects of the present disclosure.

FIG. 19 illustrates an examples 1900 of a LMF configured NTN response time 1902 for the measurement report, which may be based on a satellite type and satellite location data. The NTN response time 1902, as configured by the LMF, can approximately extend from 1000 ms to 256000 ms. The configured NTN response time 1102 can be adapted dependent on the type of satellite (e.g., LEO or MEO, where an associated satellite type field may be indicated along with the response time. In the case of LEO satellites, the response time may be more stringent, while for MEO satellites, the response time may be configured for a longer duration to accommodate the extended propagation times. In implementations, the configured response time 1902 may be a function of the satellite location information, 3D positioning information, altitude, location with respect to the horizon, and any other type of satellite location information.

In another implementation, depending on the type of NTN architecture (e.g., transmission point-based as a transparent-payload architecture (TPA) or transmission point-based on a regenerative-payload architecture (RPA), multiple response times can be configured. In an event that the UE cannot report the measurements within the response time, the UE may drop some measurements to adhere to the response time. Additionally, the response time may also be a function of the ephemeris data of the NTN satellite, and therefore subject to behaviors such as the mobility of the NTN satellite.

In an implementation, a response time may not be configured, and the location measurement report is provided on a best-effort basis. Alternatively, multiple values of response times may be configured, wherein each value of a response time is associated with a condition as described below, and/or the response time as a function of the time duration spent in a defined area (e.g., in a cell or zone). If a UE does not detect a TN gNB (base station), then a higher value of response time may be applied. If a UE does not have access to a satellite gNB with a lower altitude constellation (e.g., a LEO satellite rather than a MEO satellite as the serving gNB (base station), then a higher value of response time may be applied. If a UE experiences a handover to another serving satellite gNB (base station), such as for a RPA, or a feeder link switchover, such as for a TPA, within a time period T from the location measurement request, a higher value of response time may be applied. Further, the value of a response time may depend on the positioning quality of service (QOS) requirements in terms of latency, time-to-first-fix (TTFF).

In an implementation, two values of a response time may be configured, where a first value of the response time is applied to an updated position information and a second value of the response time is applied to a latest, subsequent position information. Then, if a determination is made that the updated position information cannot be provided in time according to the first value of the response time, the UE can send a measurement report comprising the latest, subsequent position information obtained for the UE. The system may then send an updated position information at a later time once the information is provided by the UE. This technique may be particularly useful when the size of a satellite constellation does not necessarily allow a UE to be connected to a satellite close to its zenith, which would provide a small propagation delay. The first and second values of the response time may be determined, fully or partially, based on minimum and maximum distances between a satellite gNB and a UE, which in turn determines a range of propagation delays between the UE and the satellite gNB (base station).

FIG. 20 illustrates an example 2000 of the ASN. 1 start configuration. The LMF can configure additional triggered reporting criteria and reporting intervals that take into account the different UE behavior when reporting measurements and/or location estimates to the LMF in an NTN supported network. In an implementation, an additional triggered criteria for reporting can include an NTN cell change as shown at 2002 (i.e., on each occasion that a UE changes to a different NTN cell), when the measurement and/or location estimate is reported, or when an NTN satellite is in-coverage. The reporting interval can be expanded as shown at 2004 to account for propagation delays arising from transmissions received from an NTN TPs as well as between and NTN TPs and gateway. The UE can also report the type of environment as shown at 2006, such as based on a TN area and/or NTN area.

Figure 21:
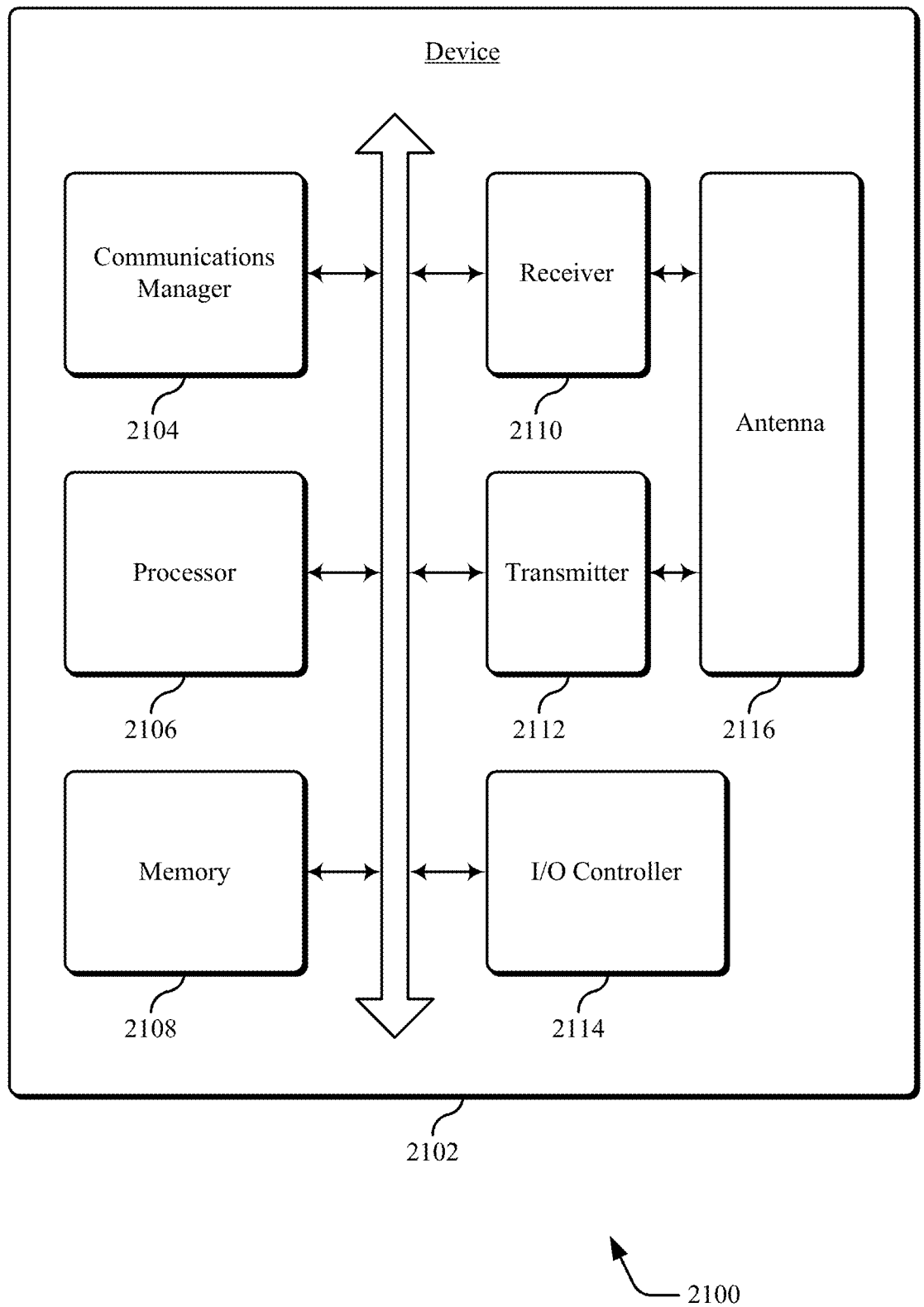
FIG. 21 illustrates an example block diagram of components of a device that supports configuration and reporting in an NTN in accordance with aspects of the present disclosure.

FIG. 21 illustrates an example of a block diagram 2100 of a device 2102 that supports configuration and reporting in an NTN in accordance with aspects of the present disclosure. The device 2102 may be an example of a UE 104 as described herein. The device 2102 may support wireless communication with one or more base stations 102, UEs 104, or any combination thereof. The device 2102 may include components for bi-directional communications including components for transmitting and receiving communications, such as a communications manager 2104, a processor 2106, a memory 2108, a receiver 2110, a transmitter 2112, and an I/O controller 2114. These components may be in electronic communication or otherwise coupled (e.g., operatively, communicatively, functionally, electronically, electrically) via one or more interfaces (e.g., buses).

The communications manager 2104, the receiver 2110, the transmitter 2112, or various combinations thereof or various components thereof may be examples of means for performing various aspects of the present disclosure as described herein. For example, the communications manager 2104, the receiver 2110, the transmitter 2112, or various combinations or components thereof may support a method for performing one or more of the functions described herein.

In some implementations, the communications manager 2104, the receiver 2110, the transmitter 2112, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some implementations, the processor 2106 and the memory 2108 coupled with the processor 2106 may be configured to perform one or more of the functions described herein (e.g., by executing, by the processor 2106, instructions stored in the memory 2108).

Additionally or alternatively, in some implementations, the communications manager 2104, the receiver 2110, the transmitter 2112, or various combinations or components thereof may be implemented in code (e.g., as communications management software or firmware) executed by the processor 2106. If implemented in code executed by the processor 2106, the functions of the communications manager 2104, the receiver 2110, the transmitter 2112, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some implementations, the communications manager 2104 may be configured to perform various operations (e.g., receiving, monitoring, transmitting) using or otherwise in cooperation with the receiver 2110, the transmitter 2112, or both. For example, the communications manager 2104 may receive information from the receiver 2110, send information to the transmitter 2112, or be integrated in combination with the receiver 2110, the transmitter 2112, or both to receive information, transmit information, or perform various other operations as described herein. Although the communications manager 2104 is illustrated as a separate component, in some implementations, one or more functions described with reference to the communications manager 2104 may be supported by or performed by the processor 2106, the memory 2108, or any combination thereof. For example, the memory 2108 may store code, which may include instructions executable by the processor 2106 to cause the device 2102 to perform various aspects of the present disclosure as described herein, or the processor 2106 and the memory 2108 may be otherwise configured to perform or support such operations.

For example, the communications manager 2104 may support wireless communication at a device (e.g., the device 2102, UE) in accordance with examples as disclosed herein. The communications manager 2104 and/or other device components may be configured as or otherwise support an apparatus, such as a user equipment, including a receiver to: receive, from a location server of a non-terrestrial network, first control signaling indicating a first positioning reference signal configuration comprising positioning assistance data and measurement reporting configuration; receive second control signaling indicating a second positioning reference signal configuration based at least in part on the first control signaling, the second positioning reference signal configuration indicating adapted positioning reference signal information based at least in part on one or more of mobility, an interference level, or a propagation delay pattern; receive third control signaling indicating a third positioning reference signal configuration based at least in part on the second control signaling, the third positioning reference signal configuration comprising a duration for reporting a measurement of reference signals based at least in part on the adapted positioning reference signal information; and a transmitter to transmit, to the location server of the non-terrestrial network, a report indicating at least one of the measurement of the reference signals or a location estimate based at least in part on the duration for the reporting.

Additionally, the apparatus (e.g., a UE) includes any one or combination of: the positioning assistance data includes positioning reference signal configurations associated with one or more of time and frequency resources for transmission, muting pattern configurations, a transmission power, repetition transmission, a periodicity and slot offset, a number of symbols to be transmitted, or a comb size and resource element offset. The measurement reporting configuration includes a request for one or more radio access technology-independent positioning techniques or radio access technology-dependent positioning techniques, comprising one or more of downlink-time difference of arrival, multi-round trip time, or downlink-angle of departure. The positioning assistance data and the measurement reporting configuration is combined in a non-terrestrial network configuration message received from the location server as a dedicated unicast configuration or a broadcast message to one or more user equipment. The positioning assistance data is preconfigured for available positioning reference signal configuration at the apparatus in the non-terrestrial network system, and wherein the positioning assistance data is one or more of activated, modified, deactivated, or associated with a set of validity conditions. The receiver is configured to receive a positioning reference signal configuration message that includes multiple sets of positioning reference signal periodicities as functions of location information and ephemeris data associated with at least one non-terrestrial station in the non-terrestrial network system. The positioning assistance data includes a positioning reference signal muting pattern as a function of a geographical zone defined by three-dimensional ephemeris data associated with at least one non-terrestrial station, or defined by a two-dimensional projection of the three-dimensional ephemeris data on earth. The positioning assistance data includes a positioning reference signal muting pattern as a function of one or more of a quantity of base stations implemented in respective non-terrestrial stations; a quantity of transmission beams emitted from the respective non-terrestrial stations; or a Doppler shift of the positioning reference signal. The positioning assistance data includes a non-terrestrial network positioning measurement window configured by the location server with one or more of a start time, a time duration, a periodicity, or a repetition factor. The positioning assistance data includes a response time as a function of propagation time delays associated with the apparatus, at least one non-terrestrial station, and a gateway. The third positioning reference signal configuration includes a conditional response time configured by the location server based on a set of defined conditions associated with the non-terrestrial network system. The third positioning reference signal configuration includes multiple response times configured by the location server based on a validity of the positioning assistance data. The measurement reporting configuration is based on one or more of non-terrestrial network-specific reporting criteria, non-terrestrial network-specific reporting periodicities, or non-terrestrial network-related environmental variables.

The communications manager 2104 and/or other device components may be configured as or otherwise support a means for wireless communication at a user equipment, including receiving, from a location server of a non-terrestrial network, first control signaling indicating a first positioning reference signal configuration comprising positioning assistance data and measurement reporting configuration; receiving second control signaling indicating a second positioning reference signal configuration based at least in part on the first control signaling, the second positioning reference signal configuration indicating adapted positioning reference signal information based at least in part on one or more of mobility, an interference level, or a propagation delay pattern; receiving third control signaling indicating a third positioning reference signal configuration based at least in part on the second control signaling, the third positioning reference signal configuration comprising a duration for reporting a measurement of reference signals based at least in part on the adapted positioning reference signal information; and transmitting, to the location server of the non-terrestrial network, a report indicating at least one of the measurement of the reference signals or a location estimate based at least in part on the duration for the reporting.

Additionally, wireless communication at the user equipment includes any one or combination of: the positioning assistance data includes positioning reference signal configurations associated with one or more of time and frequency resources for transmission, muting pattern configurations, a transmission power, repetition transmission, a periodicity and slot offset, a number of symbols to be transmitted, or a comb size and resource element offset. The measurement reporting configuration includes measurement quality metrics and a request for one or more radio access technology-independent positioning techniques or radio access technology-dependent positioning techniques, comprising one or more of downlink-time difference of arrival, multi-round trip time, or downlink-angle of departure. The positioning assistance data and the measurement reporting configuration is combined in a non-terrestrial network configuration message received from the location server as a dedicated unicast configuration or a broadcast message to one or more user equipment. The positioning assistance data is preconfigured for available positioning reference signal configuration at the user equipment in the non-terrestrial network system, and wherein the positioning assistance data is one or more of activated, modified, deactivated, or associated with a set of validity conditions. The method further comprising receiving a positioning reference signal configuration message that includes multiple sets of positioning reference signal periodicities as functions of location information and ephemeris data associated with at least one non-terrestrial station in the non-terrestrial network system. The positioning assistance data includes a positioning reference signal muting pattern as a function of a geographical zone defined by three-dimensional ephemeris data associated with at least one non-terrestrial station, or defined by a two-dimensional projection of the three-dimensional ephemeris data on earth. The positioning assistance data includes a positioning reference signal muting pattern as a function of one or more of a quantity of base stations implemented in respective non-terrestrial stations; a quantity of transmission beams emitted from the respective non-terrestrial stations; or a Doppler shift of the positioning reference signal. The positioning assistance data includes a non-terrestrial network positioning measurement window configured by the location server with one or more of a start time, a time duration, a periodicity, or a repetition factor. The positioning assistance data includes a response time as a function of propagation time delays associated with the user equipment, at least one non-terrestrial station, and a gateway. The third positioning reference signal configuration includes a conditional response time configured by the location server based on a set of defined conditions associated with the non-terrestrial network system. The third positioning reference signal configuration includes multiple response times configured by the location server based on a validity of the positioning assistance data. The measurement reporting configuration is based on one or more of non-terrestrial network-specific reporting criteria, non-terrestrial network-specific reporting periodicities, or non-terrestrial network-related environmental variables.

The processor 2106 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some implementations, the processor 2106 may be configured to operate a memory array using a memory controller. In some other implementations, a memory controller may be integrated into the processor 2106. The processor 2106 may be configured to execute computer-readable instructions stored in a memory (e.g., the memory 2108) to cause the device 2102 to perform various functions of the present disclosure.

The memory 2108 may include random access memory (RAM) and read-only memory (ROM). The memory 2108 may store computer-readable, computer-executable code including instructions that, when executed by the processor 2106 cause the device 2102 to perform various functions described herein. The code may be stored in a non-transitory computer-readable medium such as system memory or another type of memory. In some implementations, the code may not be directly executable by the processor 2106 but may cause a computer (e.g., when compiled and executed) to perform functions described herein. In some implementations, the memory 2108 may include, among other things, a basic I/O system (BIOS) which may control basic hardware or software operation such as the interaction with peripheral components or devices.

The I/O controller 2114 may manage input and output signals for the device 2102. The I/O controller 2114 may also manage peripherals not integrated into the device 2102. In some implementations, the I/O controller 2114 may represent a physical connection or port to an external peripheral. In some implementations, the I/O controller 2114 may utilize an operating system such as iOS®, ANDROID®, MS-DOS®, MS-WINDOWS®, OS/2®, UNIX®, LINUX®, or another known operating system. In some implementations, the I/O controller 2114 may be implemented as part of a processor, such as the processor 2106. In some implementations, a user may interact with the device 2102 via the I/O controller 2114 or via hardware components controlled by the I/O controller 2114.

In some implementations, the device 2102 may include a single antenna 2116. However, in some other implementations, the device 2102 may have more than one antenna 2116, which may be capable of concurrently transmitting or receiving multiple wireless transmissions. The receiver 2110 and the transmitter 2112 may communicate bi-directionally, via the one or more antennas 2116, wired, or wireless links as described herein. For example, the receiver 2110 and the transmitter 2112 may represent a wireless transceiver and may communicate bi-directionally with another wireless transceiver. The transceiver may also include a modem to modulate the packets, to provide the modulated packets to one or more antennas 2116 for transmission, and to demodulate packets received from the one or more antennas 2116.

Figure 22:
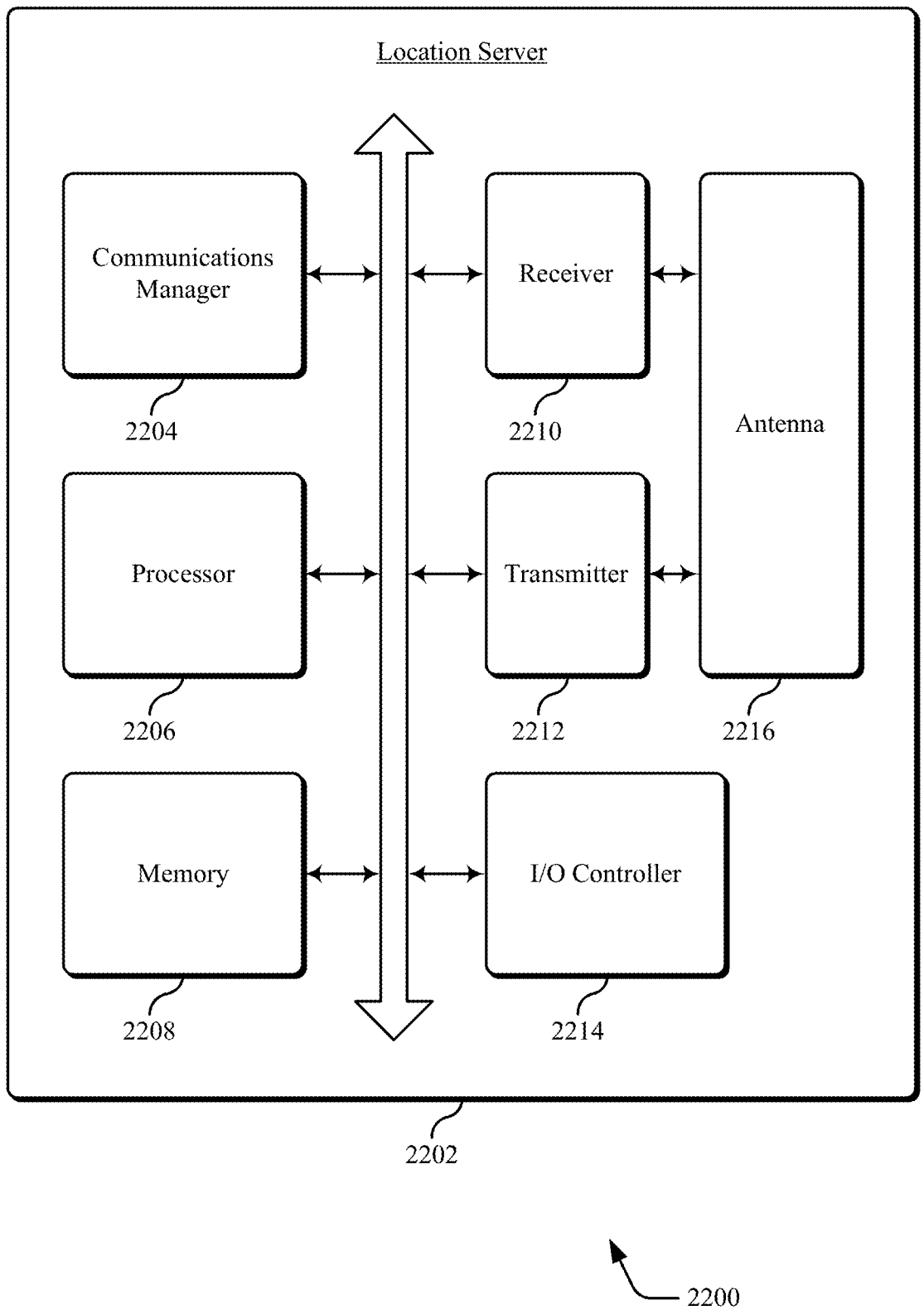
FIG. 22 illustrates an example block diagram of components of a location server that supports configuration and reporting in an NTN in accordance with aspects of the present disclosure.

FIG. 22 illustrates an example of a block diagram 2200 of a device 2202 that supports configuration and reporting in an NTN in accordance with aspects of the present disclosure. The device 2202 may be an example of a location server in an NTN as described herein. The device 2202 may support wireless communication and/or network signaling with one or more base stations 102, UEs 104, NTSs, or any combination thereof. The device 2202 may include components for bi-directional communications including components for transmitting and receiving communications, such as a communications manager 2204, a processor 2206, a memory 2208, a receiver 2210, a transmitter 2212, and an I/O controller 2214. These components may be in electronic communication or otherwise coupled (e.g., operatively, communicatively, functionally, electronically, electrically) via one or more interfaces (e.g., buses).

The communications manager 2204, the receiver 2210, the transmitter 2212, or various combinations thereof or various components thereof may be examples of means for performing various aspects of the present disclosure as described herein. For example, the communications manager 2204, the receiver 2210, the transmitter 2212, or various combinations or components thereof may support a method for performing one or more of the functions described herein.

In some implementations, the communications manager 2204, the receiver 2210, the transmitter 2212, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some implementations, the processor 2206 and the memory 2208 coupled with the processor 2206 may be configured to perform one or more of the functions described herein (e.g., by executing, by the processor 2206, instructions stored in the memory 2208).

Additionally or alternatively, in some implementations, the communications manager 2204, the receiver 2210, the transmitter 2212, or various combinations or components thereof may be implemented in code (e.g., as communications management software or firmware) executed by the processor 2206. If implemented in code executed by the processor 2206, the functions of the communications manager 2204, the receiver 2210, the transmitter 2212, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some implementations, the communications manager 2204 may be configured to perform various operations (e.g., receiving, monitoring, transmitting) using or otherwise in cooperation with the receiver 2210, the transmitter 2212, or both. For example, the communications manager 2204 may receive information from the receiver 2210, send information to the transmitter 2212, or be integrated in combination with the receiver 2210, the transmitter 2212, or both to receive information, transmit information, or perform various other operations as described herein. Although the communications manager 2204 is illustrated as a separate component, in some implementations, one or more functions described with reference to the communications manager 2204 may be supported by or performed by the processor 2206, the memory 2208, or any combination thereof. For example, the memory 2208 may store code, which may include instructions executable by the processor 2206 to cause the device 2202 to perform various aspects of the present disclosure as described herein, or the processor 2206 and the memory 2208 may be otherwise configured to perform or support such operations.

For example, the communications manager 2204 may support wireless communication at a device (e.g., the device 2202, location server) in accordance with examples as disclosed herein. The communications manager 2204 and/or other device components may be configured as or otherwise support an apparatus, such as a location server, including a transmitter to: transmit, to a user equipment in a non-terrestrial network, first control signaling indicating a first positioning reference signal configuration comprising positioning assistance data and measurement reporting configuration; transmit second control signaling indicating a second positioning reference signal configuration based at least in part on the first control signaling, the second positioning reference signal configuration indicating adapted positioning reference signal information based at least in part on one or more of mobility, an interference level, or a propagation delay pattern; transmit third control signaling indicating a third positioning reference signal configuration based at least in part on the second control signaling, the third positioning reference signal configuration comprising a duration for reporting a measurement of reference signals based at least in part on the adapted positioning reference signal information; and a receiver to receive, from a user equipment in the non-terrestrial network, one or more of a positioning measurement report or a location estimate from the user equipment, the positioning measurement report indicating positioning measurements associated with positioning reference signal transmissions.

Additionally, the apparatus (e.g., a location server) includes any one or combination of: the measurement reporting configuration includes a request for one or more radio access technology-independent positioning techniques or radio access technology-dependent positioning techniques, comprising one or more of downlink-time difference of arrival, multi-round trip time, or downlink-angle of departure. The transmitter is configured to unicast or broadcast the positioning assistance data and the measurement reporting configuration in a combined non-terrestrial network configuration message to one or more user equipment. The positioning assistance data includes positioning reference signal configurations associated with one or more of time and frequency resources for transmission, muting pattern configurations, a transmission power, repetition transmission, a periodicity and slot offset, a number of symbols to be transmitted, or a comb size and resource element offset. The positioning assistance data is preconfigured for available positioning reference signal configuration at the user equipment in the non-terrestrial network system, and wherein the positioning assistance data is one or more of activated, modified, deactivated, or associated with a set of validity conditions. The transmitter is configured to transmit a positioning reference signal configuration message that includes multiple sets of positioning reference signal periodicities as functions of location information and ephemeris data associated with at least one non-terrestrial station in the non-terrestrial network system. The positioning assistance data includes a positioning reference signal muting pattern as a function of a geographical zone defined by three-dimensional ephemeris data associated with at least one non-terrestrial station, or defined by a two-dimensional projection of the three-dimensional ephemeris data on earth. The positioning assistance data includes a positioning reference signal muting pattern as a function of one or more of a quantity of base stations implemented in respective non-terrestrial stations; a quantity of transmission beams emitted from the respective non-terrestrial stations; or a Doppler shift of the positioning reference signal. The positioning assistance data includes a non-terrestrial network positioning measurement window configured by the apparatus with one or more of a start time, a time duration, a periodicity, or a repetition factor. The positioning assistance data includes a response time as a function of propagation time delays associated with the apparatus, at least one non-terrestrial station, and a gateway. The third positioning reference signal configuration includes a conditional response time configured by the apparatus based on a set of defined conditions associated with the non-terrestrial network system. The third positioning reference signal configuration includes multiple response times configured by the location server based on a validity of the positioning assistance data. The measurement reporting configuration is based on one or more of non-terrestrial network-specific reporting criteria, non-terrestrial network-specific reporting periodicities, or non-terrestrial network-related environmental variables.

The communications manager 2104 and/or other device components may be configured as or otherwise support a means for network signaling at a location server, including transmitting, to a user equipment in a non-terrestrial network, first control signaling indicating a first positioning reference signal configuration comprising positioning assistance data and measurement reporting configuration; transmitting second control signaling indicating a second positioning reference signal configuration based at least in part on the first control signaling, the second positioning reference signal configuration indicating adapted positioning reference signal information based at least in part on one or more of mobility, an interference level, or a propagation delay pattern; transmitting third control signaling indicating a third positioning reference signal configuration based at least in part on the second control signaling, the third positioning reference signal configuration comprising a duration for reporting a measurement of reference signals based at least in part on the adapted positioning reference signal information; and receiving, from a user equipment in the non-terrestrial network, one or more of a positioning measurement report or a location estimate from the user equipment, the positioning measurement report indicating positioning measurements associated with positioning reference signal transmissions.

Additionally, network signaling at the user equipment includes any one or combination of: the measurement reporting configuration includes a request for one or more radio access technology-independent positioning techniques or radio access technology-dependent positioning techniques, comprising one or more of downlink-time difference of arrival, multi-round trip time, or downlink-angle of departure. The method includes broadcasting the positioning assistance data and the measurement reporting configuration in a combined non-terrestrial network configuration message to one or more user equipment. The positioning assistance data includes positioning reference signal configurations associated with one or more of time and frequency resources for transmission, muting pattern configurations, a transmission power, repetition transmission, a periodicity and slot offset, a number of symbols to be transmitted, or a comb size and resource element offset. The positioning assistance data is preconfigured for available positioning reference signal configuration at the user equipment in the non-terrestrial network system, and the positioning assistance data is one or more of activated, modified, deactivated, or associated with a set of validity conditions. The method includes transmitting a positioning reference signal configuration message that includes multiple sets of positioning reference signal periodicities as functions of location information and ephemeris data associated with at least one non-terrestrial station in the non-terrestrial network system. The positioning assistance data includes a positioning reference signal muting pattern as a function of a geographical zone defined by three-dimensional ephemeris data associated with at least one non-terrestrial station, or defined by a two-dimensional projection of the three-dimensional ephemeris data on earth. The positioning assistance data includes a positioning reference signal muting pattern as a function of one or more of a quantity of base stations implemented in respective non-terrestrial stations; a quantity of transmission beams emitted from the respective non-terrestrial stations; or a Doppler shift of the positioning reference signal. The positioning assistance data includes a non-terrestrial network positioning measurement window configured by the location server with one or more of a start time, a time duration, a periodicity, or a repetition factor. The positioning assistance data includes a response time as a function of propagation time delays associated with the apparatus, at least one non-terrestrial station, and a gateway. The third positioning reference signal configuration includes a conditional response time configured by the location server based on a set of defined conditions associated with the non-terrestrial network system. The third positioning reference signal configuration includes multiple response times configured by the location server based on a validity of the positioning assistance data. The measurement reporting configuration is based on one or more of non-terrestrial network-specific reporting criteria, non-terrestrial network-specific reporting periodicities, or non-terrestrial network-related environmental variables.

The processor 2206 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some implementations, the processor 2206 may be configured to operate a memory array using a memory controller. In some other implementations, a memory controller may be integrated into the processor 2206. The processor 2206 may be configured to execute computer-readable instructions stored in a memory (e.g., the memory 2208) to cause the device 2202 to perform various functions of the present disclosure.

The memory 2208 may include random access memory (RAM) and read-only memory (ROM). The memory 2208 may store computer-readable, computer-executable code including instructions that, when executed by the processor 2206 cause the device 2202 to perform various functions described herein. The code may be stored in a non-transitory computer-readable medium such as system memory or another type of memory. In some implementations, the code may not be directly executable by the processor 2206 but may cause a computer (e.g., when compiled and executed) to perform functions described herein. In some implementations, the memory 2208 may include, among other things, a basic I/O system (BIOS) which may control basic hardware or software operation such as the interaction with peripheral components or devices.

The I/O controller 2214 may manage input and output signals for the device 2202. The I/O controller 2214 may also manage peripherals not integrated into the device 2202. In some implementations, the I/O controller 2214 may represent a physical connection or port to an external peripheral. In some implementations, the I/O controller 2214 may utilize an operating system such as iOS®, ANDROID®, MS-DOS®, MS-WINDOWS®, OS/2®, UNIX®, LINUX®, or another known operating system. In some implementations, the I/O controller 2214 may be implemented as part of a processor, such as the processor 2206. In some implementations, a user may interact with the device 2202 via the I/O controller 2214 or via hardware components controlled by the I/O controller 2214.

In some implementations, the device 2202 may include a single antenna 2216. However, in some other implementations, the device 2202 may have more than one antenna 2216, which may be capable of concurrently transmitting or receiving multiple wireless transmissions. The receiver 2210 and the transmitter 2212 may communicate bi-directionally, via the one or more antennas 2216, wired, or wireless links as described herein. For example, the receiver 2210 and the transmitter 2212 may represent a wireless transceiver and may communicate bi-directionally with another wireless transceiver. The transceiver may also include a modem to modulate the packets, to provide the modulated packets to one or more antennas 2216 for transmission, and to demodulate packets received from the one or more antennas 2216.

Figure 23:
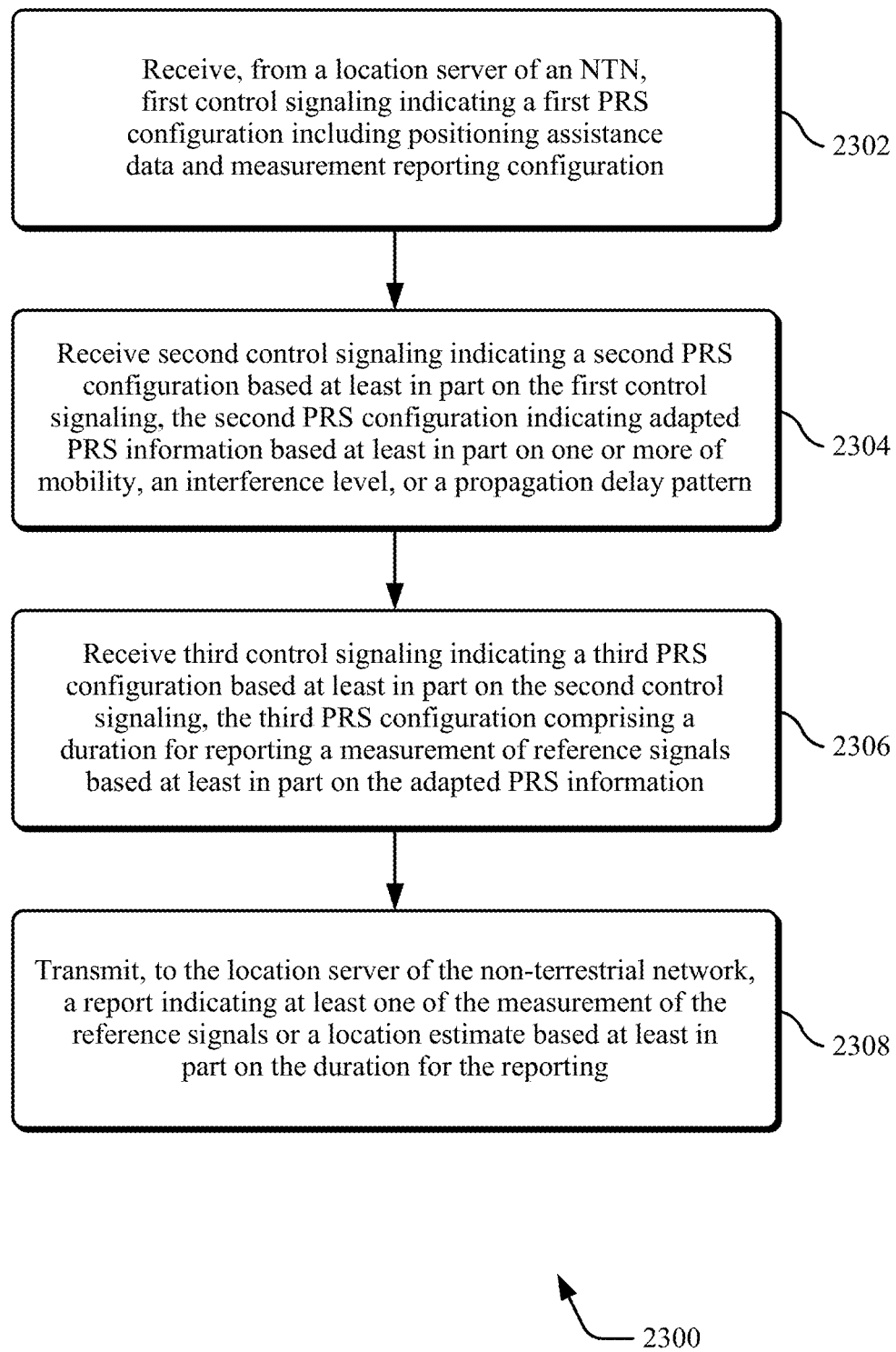
FIGS. 23 and 24 illustrate flowcharts of methods that support configuration and reporting in an NTN in accordance with aspects of the present disclosure.

FIG. 23 illustrates a flowchart of a method 2300 that supports configuration and reporting in an NTN in accordance with aspects of the present disclosure. The operations of the method 2300 may be implemented by a device or its components as described herein. For example, the operations of the method 2300 may be performed by a device, such as UE 104 as described with reference to FIGS. 1 through 22. In some implementations, the device may execute a set of instructions to control the function elements of the device to perform the described functions. Additionally, or alternatively, the device may perform aspects of the described functions using special-purpose hardware.

At 2302, the method may include receiving, from a location server of an NTN, first control signaling indicating a first PRS configuration including positioning assistance data and measurement reporting configuration. The operations of 2302 may be performed in accordance with examples as described herein. In some implementations, aspects of the operations of 2302 may be performed by a device as described with reference to FIG. 1.

At 2304, the method may include receiving second control signaling indicating a second PRS configuration based at least in part on the first control signaling, the second PRS configuration indicating adapted PRS information based at least in part on one or more of mobility, an interference level, or a propagation delay pattern. The operations of 2304 may be performed in accordance with examples as described herein. In some implementations, aspects of the operations of 2304 may be performed by a device as described with reference to FIG. 1.

At 2306, the method may include receiving third control signaling indicating a third PRS configuration based at least in part on the second control signaling, the third PRS configuration comprising a duration for reporting a measurement of reference signals based at least in part on the adapted PRS information. The operations of 2306 may be performed in accordance with examples as described herein. In some implementations, aspects of the operations of 2306 may be performed by a device as described with reference to FIG. 1.

At 2308, the method may include transmitting, to the location server of the non-terrestrial network, a report indicating at least one of the measurement of the reference signals or a location estimate based at least in part on the duration for the reporting. The operations of 2308 may be performed in accordance with examples as described herein. In some implementations, aspects of the operations of 2308 may be performed by a device as described with reference to FIG. 1.

Figure 24:
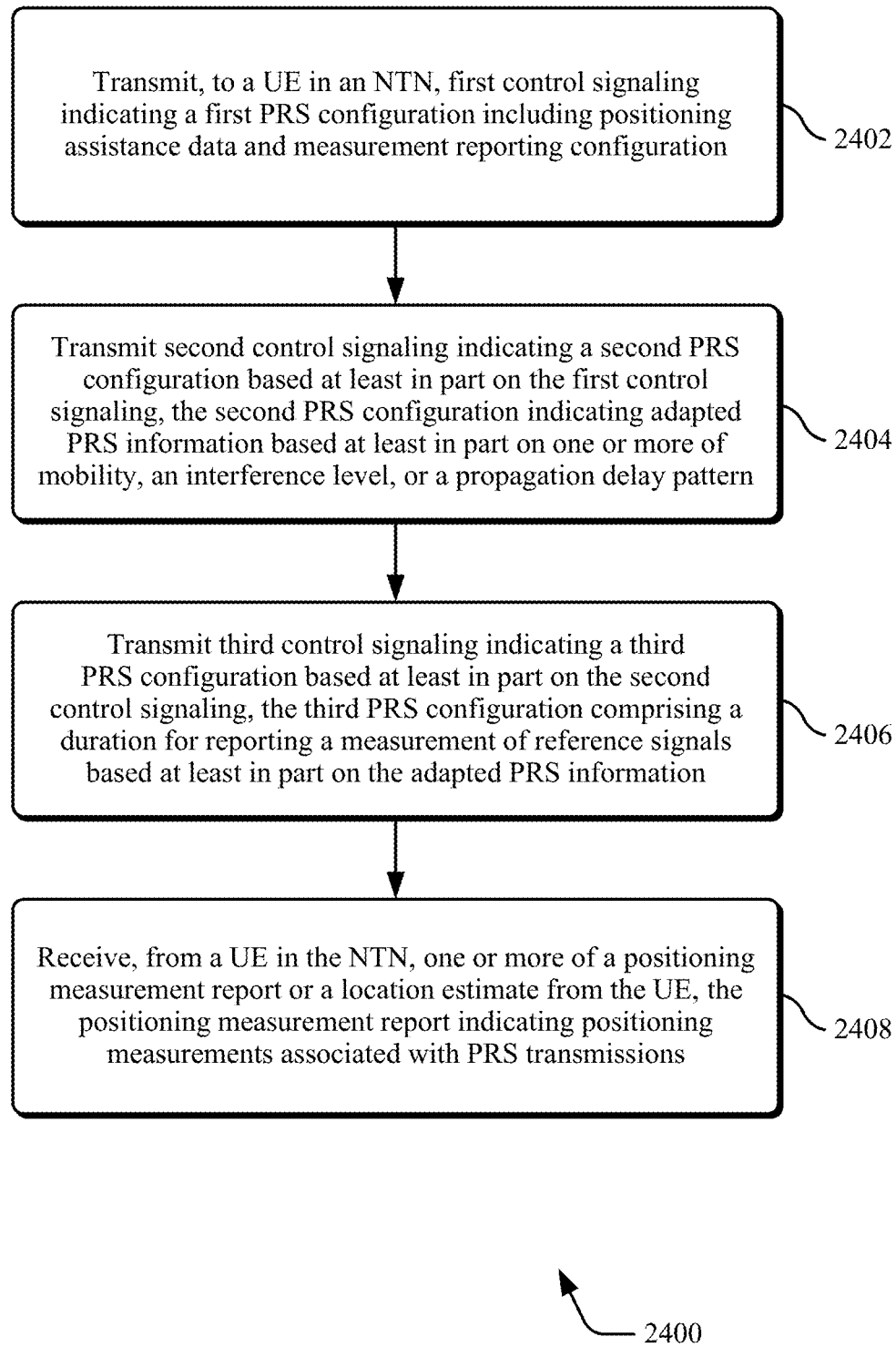

FIG. 24 illustrates a flowchart of a method 2400 that supports configuration and reporting in an NTN in accordance with aspects of the present disclosure. The operations of the method 2400 may be implemented by a device or its components as described herein. For example, the operations of the method 2400 may be performed by a location server as described with reference to FIGS. 1 through 22. In some implementations, the device may execute a set of instructions to control the function elements of the device to perform the described functions. Additionally, or alternatively, the device may perform aspects of the described functions using special-purpose hardware.

At 2402, the method may include transmitting, to a UE in an NTN, first control signaling indicating a first PRS configuration including positioning assistance data and measurement reporting configuration. The operations of 2402 may be performed in accordance with examples as described herein. In some implementations, aspects of the operations of 2402 may be performed by a device as described with reference to FIG. 1.

At 2404, the method may include transmitting second control signaling indicating a second PRS configuration based at least in part on the first control signaling, the second PRS configuration indicating adapted PRS information based at least in part on one or more of mobility, an interference level, or a propagation delay pattern. The operations of 2404 may be performed in accordance with examples as described herein. In some implementations, aspects of the operations of 2404 may be performed by a device as described with reference to FIG. 1.

At 2406, the method may include transmitting third control signaling indicating a third PRS configuration based at least in part on the second control signaling, the third PRS configuration comprising a duration for reporting a measurement of reference signals based at least in part on the adapted PRS information. The operations of 2406 may be performed in accordance with examples as described herein. In some implementations, aspects of the operations of 2406 may be performed by a device as described with reference to FIG. 1.

At 2408, the method may include receiving, from a UE in the NTN, one or more of a positioning measurement report or a location estimate from the UE, the positioning measurement report indicating positioning measurements associated with PRS transmissions. The operations of 2408 may be performed in accordance with examples as described herein. In some implementations, aspects of the operations of 2408 may be performed by a device as described with reference to FIG. 1.

It should be noted that the methods described herein describe possible implementations, and that the operations and the steps may be rearranged or otherwise modified and that other implementations are possible. Further, aspects from two or more of the methods may be combined. The order in which the methods are described is not intended to be construed as a limitation, and any number or combination of the described method operations may be performed in any order to perform a method, or an alternate method.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor.

Any connection may be properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on. Further, as used herein, including in the claims, a "set" may include one or more elements.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form to avoid obscuring the concepts of the described example.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
at least one memory; and
at least one processor coupled with the at least one memory and configured to cause the UE to:
receive, from a location server of a non-terrestrial network (NTN), first control signaling indicating a first positioning reference signal (PRS) configuration comprising positioning assistance data and measurement reporting configuration, wherein the positioning assistance data comprises a PRS muting pattern that is based at least in part on a Doppler shift of PRSs;
receive second control signaling indicating a second PRS configuration based at least in part on the first control signaling, the second PRS configuration indicating adapted PRS information based at least in part on one or more of mobility, an interference level, or a propagation delay pattern;
receive third control signaling indicating a third PRS configuration based at least in part on the second control signaling, the third PRS configuration comprising a duration for reporting a measurement of the PRSs based at least in part on the adapted PRS information; and transmit, to the location server of the NTN, a report indicating at least one of a timing drift associated with the Doppler shift of the PRSs, the measurement of the PRSs, or a location estimate based at least in part on the duration for the reporting.

2. The UE of claim 1, wherein the positioning assistance data comprises PRS configurations associated with one or more of time and frequency resources for transmission, muting pattern configurations, a transmission power, repetition transmission, a periodicity and slot offset, a number of symbols to be transmitted, or a comb size and resource element offset.

3. The UE of claim 1, wherein the measurement reporting configuration comprises a request for one or more radio access technology-independent positioning techniques or radio access technology-dependent positioning techniques, comprising one or more of downlink-time difference of arrival, multi-round trip time, or downlink-angle of departure.

4. The UE of claim 1, wherein the positioning assistance data and the measurement reporting configuration is combined in an NTN configuration message received from the location server as a dedicated unicast configuration or a broadcast message to one or more UEs.

5. The UE of claim 1, wherein the positioning assistance data is preconfigured for an available PRS configuration at the UE, and wherein the positioning assistance data is one or more of activated, modified, deactivated, or associated with a set of validity conditions.

6. The UE of claim 1, wherein the at least one processor is further configured to cause the UE to receive a PRS configuration message that comprises multiple sets of PRS periodicities as functions of location information and ephemeris data associated with at least one non-terrestrial station in an NTN system.

7. The UE of claim 1, wherein the PRS muting pattern is a function of a geographical zone defined by three-dimensional ephemeris data associated with at least one non-terrestrial station, or defined by a two-dimensional projection of the three-dimensional ephemeris data on earth.

8. The UE of claim 1, wherein the PRS muting pattern is a function of one or more of a quantity of base stations implemented in respective non-terrestrial stations, a quantity of transmission beams emitted from the respective non-terrestrial stations, or the Doppler shift of the PRSs.

9. The UE of claim 1, wherein the positioning assistance data comprises an NTN positioning measurement window configured by the location server with one or more of a start time, a time duration, a periodicity, or a repetition factor.

10. The UE of claim 1, wherein the positioning assistance data comprises a response time as a function of propagation time delays associated with the UE, at least one non-terrestrial station, and a gateway.

11. The UE of claim 1, wherein the third PRS configuration comprises a conditional response time configured by the location server based on a set of defined conditions associated with the NTN.

12. The UE of claim 1, wherein the third PRS configuration comprises multiple response times configured by the location server based on a validity of the positioning assistance data.

13. The UE of claim 1, wherein the measurement reporting configuration is based on one or more of NTN-specific reporting criteria, NTN-specific reporting periodicities, or NTN-related environmental variables.

14. A network equipment (NE) for wireless communication, comprising:
at least one memory; and
at least one processor coupled with the at least one memory and configured to cause the NE to:
transmit, to a user equipment (UE) in a non-terrestrial network (NTN), first control signaling indicating a first positioning reference signal (PRS) configuration comprising positioning assistance data and measurement reporting configuration, wherein the positioning assistance data comprises a PRS muting pattern that is based at least in part on a Doppler shift of PRSs;
transmit second control signaling indicating a second PRS configuration based at least in part on the first control signaling, the second PRS configuration indicating adapted PRS information based at least in part on one or more of mobility, an interference level, or a propagation delay pattern;
transmit third control signaling indicating a third PRS configuration based at least in part on the second control signaling, the third PRS configuration comprising a duration for reporting a measurement of the PRSs based at least in part on the adapted PRS information; and
receive, from the UE, a report indicating at least one of a timing drift associated with the Doppler shift of the PRSs, the measurement of the PRSs, or a location estimate based at least in part on the duration for the reporting.

15. The NE of claim 14, wherein the measurement reporting configuration comprises a request for one or more radio access technology-independent positioning techniques or radio access technology-dependent positioning techniques, comprising one or more of downlink-time difference of arrival, multi-round trip time, or downlink-angle of departure.

16. The NE of claim 14, wherein the positioning assistance data and the measurement reporting configuration are unicast or broadcast in a combined NTN configuration message to one or more UEs.

17. A method performed by a user equipment (UE), the method comprising:
receiving, from a location server of a non-terrestrial network (NTN), first control signaling indicating a first positioning reference signal (PRS) configuration comprising positioning assistance data and measurement reporting configuration, wherein the positioning assistance data comprises a PRS muting pattern that is based at least in part on a Doppler shift of PRSs;
receiving second control signaling indicating a second PRS configuration based at least in part on the first control signaling, the second PRS configuration indicating adapted PRS information based at least in part on one or more of mobility, an interference level, or a propagation delay pattern;
receiving third control signaling indicating a third PRS configuration based at least in part on the second control signaling, the third PRS configuration comprising a duration for reporting a measurement of the PRSs based at least in part on the adapted PRS information; and
transmitting, to the location server of the NTN, a report indicating at least one of a timing drift associated with the Doppler shift of the PRSs, the measurement of the PRSs, or a location estimate based at least in part on the duration for the reporting.

18. The method of claim 17, wherein the measurement reporting configuration comprises measurement quality metrics and a request for one or more radio access technology-independent positioning techniques or radio access technology-dependent positioning techniques, comprising one or more of downlink-time difference of arrival, multi-round trip time, or downlink-angle of departure.

19. The method of claim 17, wherein the positioning assistance data is preconfigured for available PRS configuration at the UE, and wherein the positioning assistance data is one or more of activated, modified, deactivated, or associated with a set of validity conditions.

20. A processor for wireless communication, comprising:
at least one controller coupled with at least one memory and configured to cause the processor to:
receive, from a location server of a non-terrestrial network (NTN), first control signaling indicating a first positioning reference signal (PRS) configuration comprising positioning assistance data and measurement reporting configuration, wherein the positioning assistance data comprises a PRS muting pattern that is based at least in part on a Doppler shift of PRSs;
receive second control signaling indicating a second PRS configuration based at least in part on the first control signaling, the second PRS configuration indicating adapted PRS information based at least in part on one or more of mobility, an interference level, or a propagation delay pattern;
receive third control signaling indicating a third PRS configuration based at least in part on the second control signaling, the third PRS configuration comprising a duration for reporting a measurement of the PRSs based at least in part on the adapted PRS information; and
transmit, to the location server of the NTN, a report indicating at least one of a timing drift associated with the Doppler shift of the PRSs, the measurement of the PRSs, or a location estimate based at least in part on the duration for the reporting.

* * * * *